US011627350B2

United States Patent
Liu et al.

(10) Patent No.: US 11,627,350 B2
(45) Date of Patent: Apr. 11, 2023

(54) ADVANCED TRICK-PLAY MODES FOR STREAMING VIDEO

(71) Applicant: TiVo Solutions Inc., San Jose, CA (US)

(72) Inventors: Kim Liu, Foster City, CA (US); Michael F. Klar, Santa Clara, CA (US); Todd Kulick, Mountain View, CA (US); Jonathan A. Logan, Mountain View, CA (US)

(73) Assignee: TIVO SOLUTIONS INC., San Jose, CA (US)

( * ) Notice: Subject to any disclaimer, the term of this patent is extended or adjusted under 35 U.S.C. 154(b) by 0 days.

(21) Appl. No.: 16/475,058

(22) PCT Filed: Dec. 14, 2017

(86) PCT No.: PCT/US2017/066294
§ 371 (c)(1),
(2) Date: Jun. 28, 2019

(87) PCT Pub. No.: WO2018/125590
PCT Pub. Date: Jul. 5, 2018

(65) Prior Publication Data
US 2020/0145701 A1      May 7, 2020

Related U.S. Application Data

(60) Provisional application No. 62/440,943, filed on Dec. 30, 2016.

(51) Int. Cl.
*H04N 21/2387* (2011.01)
*H04N 21/24* (2011.01)
(Continued)

(52) U.S. Cl.
CPC ..... *H04N 21/2387* (2013.01); *H04N 21/2401* (2013.01); *H04N 21/2402* (2013.01); *H04N 21/84* (2013.01); *H04N 21/8456* (2013.01)

(58) Field of Classification Search
CPC .......... H04N 21/2387; H04N 21/2401; H04N 21/2402; H04N 21/4384; H04N 21/6587; H04N 21/84; H04N 21/8456
See application file for complete search history.

(56) References Cited

U.S. PATENT DOCUMENTS 5,991,799 A * 11/1999 Yen ..................... G06F 16/9535
                                                        715/718
7,299,275 B2 * 11/2007 Tsukidate ............. H04N 21/222
                                                        348/E7.075

(Continued)

OTHER PUBLICATIONS

International Search Report and Written Opinion of PCT/US2017/066294 dated May 6, 2018.

*Primary Examiner* — Michael B. Pierorazio
(74) *Attorney, Agent, or Firm* — Haley Guiliano LLP

(57) ABSTRACT

Enhanced trick-play modes for video content that is being streamed to a client from a server are described. In an embodiment, the enhanced trick-play modes are provided with relatively low latency and high quality using trick-play optimization techniques for a streaming environment, avoiding the need to stream the entire contents of the portions through which the viewer is fast forwarding. By employing sophisticated selection criteria of which parts of the content to download at what time, the quality of the playback experience is improved versus that which would conventionally be possible when using a simple sequential frame data download. The streaming client maintains a cache of nearby significant frames, such as nearby key frames, in forward and/or reverse directions of the current playback position, without having to download the entire portions of the video stream in which the significant frames reside. The trick-play modes utilize these frames.

22 Claims, 8 Drawing Sheets

(51) Int. Cl.
*H04N 21/84* (2011.01)
*H04N 21/845* (2011.01)

(56) References Cited

U.S. PATENT DOCUMENTS

| | | | | |
|---|---|---|---|---|
| 7,337,392 B2* | 2/2008 | Lue | | G06F 16/9577 |
| | | | | 715/236 |
| 7,369,749 B2* | 5/2008 | Ichioka | | H04N 21/4335 |
| | | | | 386/346 |
| 7,506,355 B2* | 3/2009 | Ludvig | | H04N 21/433 |
| | | | | 715/201 |
| 7,603,683 B2* | 10/2009 | Reto | | H04N 21/47202 |
| | | | | 709/204 |
| 7,653,921 B2* | 1/2010 | Herley | | H04N 21/4332 |
| | | | | 382/199 |
| 7,712,125 B2* | 5/2010 | Herigstad | | H04N 21/4755 |
| | | | | 725/38 |
| 7,734,579 B2* | 6/2010 | White | | H04N 5/76 |
| | | | | 707/696 |
| 7,849,207 B2* | 12/2010 | Kazmi | | H04L 65/612 |
| | | | | 709/219 |
| 7,908,625 B2* | 3/2011 | Robertson | | H04N 7/106 |
| | | | | 725/141 |
| 8,307,395 B2* | 11/2012 | Issa | | H04L 67/1065 |
| | | | | 725/54 |
| 8,839,295 B2* | 9/2014 | Kim | | H04N 21/4821 |
| | | | | 725/40 |
| 9,118,814 B2* | 8/2015 | Janardhan | | H04N 7/17318 |
| 10,231,001 B2* | 3/2019 | Frantz | | H04N 21/6587 |
| 10,298,643 B1* | 5/2019 | Toal | | H04N 21/234 |
| 2002/0167540 A1* | 11/2002 | Dobbelaar | | G11B 27/102 |
| | | | | 715/716 |
| 2003/0061206 A1* | 3/2003 | Qian | | G06F 16/48 |
| 2003/0063217 A1* | 4/2003 | Smith | | H04N 7/17309 |
| | | | | 348/460 |
| 2004/0103426 A1* | 5/2004 | Ludvig | | H04H 20/86 |
| | | | | 348/E7.071 |
| 2004/0148571 A1* | 7/2004 | Lue | | G06F 16/9577 |
| | | | | 715/239 |
| 2004/0215718 A1* | 10/2004 | Kazmi | | H04L 67/02 |
| | | | | 709/203 |
| 2005/0066352 A1* | 3/2005 | Herley | | H04N 21/42203 |
| | | | | 348/E7.071 |
| 2005/0144455 A1* | 6/2005 | Haitsma | | G06F 16/634 |
| | | | | 713/176 |
| 2005/0262542 A1* | 11/2005 | DeWeese | | H04N 21/254 |
| | | | | 348/E7.071 |
| 2006/0031883 A1* | 2/2006 | Ellis | | H04N 7/17318 |
| | | | | 348/E7.071 |
| 2006/0031889 A1* | 2/2006 | Bennett | | H04N 21/41265 |
| | | | | 348/E7.071 |
| 2006/0190966 A1* | 8/2006 | McKissick | | H04N 7/147 |
| | | | | 348/E7.071 |
| 2007/0094405 A1* | 4/2007 | Zhang | | H04N 21/4331 |
| | | | | 709/231 |
| 2007/0124756 A1* | 5/2007 | Covell | | H04N 21/858 |
| | | | | 348/E7.071 |
| 2007/0157281 A1* | 7/2007 | Ellis | | H04N 21/4147 |
| | | | | 725/74 |
| 2008/0008455 A1* | 1/2008 | De Lange | | G11B 27/105 |
| | | | | 386/221 |
| 2008/0027953 A1* | 1/2008 | Morita | | H04N 21/4363 |
| 2008/0059532 A1* | 3/2008 | Kazmi | | G06F 21/10 |
| 2008/0060036 A1* | 3/2008 | Cox | | G06Q 40/12 |
| | | | | 725/110 |
| 2008/0109477 A1* | 5/2008 | Lue | | G06F 16/9577 |
| | | | | 707/999.102 |
| 2008/0133701 A1* | 6/2008 | Kazmi | | H04L 67/06 |
| | | | | 709/217 |
| 2008/0175559 A1* | 7/2008 | Jung | | H04N 5/76 |
| | | | | 386/241 |
| 2008/0215170 A1* | 9/2008 | Milbrandt | | H04L 67/306 |
| | | | | 707/999.01 |
| 2008/0235733 A1* | 9/2008 | Heie | | H04N 21/482 |
| | | | | 725/46 |
| 2008/0310814 A1* | 12/2008 | Bowra | | H04N 21/4331 |
| | | | | 709/219 |
| 2009/0037954 A1* | 2/2009 | Nagano | | H04N 21/235 |
| | | | | 725/39 |
| 2009/0119708 A1* | 5/2009 | Harrar | | G06F 8/38 |
| | | | | 725/38 |
| 2009/0313382 A1* | 12/2009 | Bouazizi | | H04L 65/4092 |
| | | | | 709/231 |
| 2009/0320058 A1* | 12/2009 | Wehmeyer | | H04N 21/2221 |
| | | | | 725/63 |
| 2009/0320072 A1* | 12/2009 | McClanahan | | H04N 21/4532 |
| | | | | 725/47 |
| 2009/0320073 A1* | 12/2009 | Reisman | | H04H 20/38 |
| | | | | 709/227 |
| 2010/0121936 A1* | 5/2010 | Liu | | H04L 65/60 |
| | | | | 709/217 |
| 2010/0131385 A1* | 5/2010 | Harrang | | G06Q 30/0631 |
| | | | | 705/26.1 |
| 2010/0251292 A1* | 9/2010 | Srinivasan | | H04N 21/47205 |
| | | | | 725/62 |
| 2010/0296487 A1* | 11/2010 | Karaoguz | | H04W 36/04 |
| | | | | 370/332 |
| 2011/0066744 A1* | 3/2011 | Del Sordo | | H04N 21/4305 |
| | | | | 709/231 |
| 2011/0068899 A1* | 3/2011 | Ioffe | | G05B 15/02 |
| | | | | 340/8.1 |
| 2011/0086619 A1* | 4/2011 | George | | H04M 1/72415 |
| | | | | 455/414.1 |
| 2011/0131618 A1 | 6/2011 | Hasek | | |
| 2011/0138064 A1* | 6/2011 | Rieger | | H04N 21/433 |
| | | | | 707/715 |
| 2011/0191439 A1* | 8/2011 | Dazzi | | G06F 15/16 |
| | | | | 709/217 |
| 2011/0191446 A1* | 8/2011 | Dazzi | | G06F 15/16 |
| | | | | 709/219 |
| 2012/0117590 A1* | 5/2012 | Agnihotri | | H04N 21/441 |
| | | | | 725/30 |
| 2012/0170915 A1* | 7/2012 | Braness | | H04N 21/26258 |
| | | | | 386/343 |
| 2012/0210216 A1* | 8/2012 | Hurst | | H04N 5/783 |
| | | | | 715/716 |
| 2012/0278725 A1* | 11/2012 | Gordon | | H04N 21/858 |
| | | | | 715/738 |
| 2012/0291079 A1* | 11/2012 | Gordon | | H04N 21/2387 |
| | | | | 725/109 |
| 2014/0282661 A1* | 9/2014 | Martin | | H04N 21/23424 |
| | | | | 725/18 |
| 2017/0064409 A1* | 3/2017 | Westerhoff | | H04N 21/6587 |
| 2018/0014041 A1* | 1/2018 | Chen | | H04L 65/612 |
| 2019/0253467 A1* | 8/2019 | Toal | | H04N 21/26258 |

\* cited by examiner

ADVANCED TRICK-PLAY MODES FOR STREAMING VIDEO

CROSS-REFERENCE TO RELATED APPLICATIONS

This application is a national stage application under 35 U.S.C. § 371 of International Application PCT/US2017/066294, filed Dec. 14, 2017, which claims the benefit of U.S. Provisional Application No. 62/440,943, filed Dec. 30, 2016, which are hereby incorporated by reference herein in their entireties.

TECHNICAL FIELD

Embodiments relate generally to digital video, and, more specifically, to techniques for streaming video from a server.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Viewers of video content value a high quality video content consumption experience. The ability to reposition the video content easily and exactly is an important part of this experience. Since viewers often do not know the time position associated with the content they wish to watch, they may desire to fast forward or rewind the video content at a faster-than-real-time rate (referred to herein as "trick-play" or "trick-play playback") to determine the desired point of viewing.

It is becoming increasingly common for viewers to view video content streamed to a client by a server over a network such as the Internet. Unfortunately, the trick-play viewing experience for streaming video content is less than satisfactory. While current technologies allow a viewer to reposition the streaming content, the viewer typically must do so by selecting an exact timestamp that the viewer wishes to jump to. In many cases, the viewer is provided with little to no feedback to indicate what particular content is associated with which timestamps in the video content.

Nonetheless, some streaming clients allow a user to fast-forward or rewind through the video content. However, the feedback given to the viewer during these trick-play operations is less than desirable. For example, thumbnails may be taken from the video content for each ten second interval of the video content, typically at a significantly lower resolution than the video content. The client may, for instance, download the thumbnails with other metadata when first requesting the video content. As a viewer fast-forwards through a ten-second interval, the client may display the thumbnail corresponding to that interval. When the viewer stops fast-forwarding, the client must typically pause for a time to reload its buffer at the new playback point.

SUMMARY

In view of these problems, approaches, techniques, and mechanisms are disclosed for providing enhanced trick-play modes for video content that is being streamed to a client from a server. In particular, a media guidance application (e.g., implemented on control circuitry) may provide enhanced trick-play modes. The enhanced trick-play modes involve playing the stream in a faster-than-real-time modes in which frames nonetheless frequently update, so as to assist a viewer in more accurately positioning the stream, particularly at higher and higher fast forward or rewind "rates." For example, the media guidance application provides the enhanced trick-play modes are with relatively low latency and high quality using trick-play optimization techniques for a streaming environment, avoiding the need to stream the entire contents of the portions through which the viewer is fast forwarding.

In some aspects, the media guidance application (e.g., implemented on the control circuitry of a client device or a network device) performs a trick-play operation with streaming media while the media is streaming. The client device may comprise non-transitory computer-readable media storing instructions that, when executed by one or more computing devices, cause performance of the functions discussed below. Likewise, the client device may be an apparatus comprising one or more subsystems collectively configured to perform the functions discussed below. For example, the media guidance application may receive metadata describing at least one stream of a video content item, the metadata including frame address information specifying locations of specific video frames within the stream. For example, the frame address information may also specify locations of specific video frames in one or more additional streams, wherein the selected video frames include video frames extracted from the one or more additional streams.

Based on streaming video content from at least the one stream, the media guidance application may maintain (e.g., in memory of the client device), within a buffer, a normal buffer window of continuous video content for the video content item. For example, the normal buffer window includes at least a first segment from the stream and a second segment from another stream described by the metadata. The video content item may be streamed using an HTTP Live Streaming Protocol (HLS). Furthermore, the frame address information may be generated, based on the stream, at a proxy server, from which the video content item is initially requested.

The media guidance application may (e.g., using the control circuitry of the client device) play the video content item in a normal playback mode using the normal buffer window, a boundary of the continuous video content maintained ahead of a moving playback position while in the normal playback mode. In some embodiments, the media guidance application may determine target sizes of the normal buffer window and/or the trick-play window based on one or more of: current streaming performance metrics, or a current playback mode.

Based at least on the frame address information, the media guidance application may (e.g., using the control circuitry of the client device) maintain a trick-play window within the buffer, the trick-play window buffering, for a portion of the video content item outside of the normal buffer window, only a subset of video frames selected from available video frames in that portion. For example, the selected video frames may be individual frames spaced at approximately equal time intervals relative to the video content item. Furthermore, the trick-play window may buffer the selected video frames without buffering ranges of the available video frames that are in intervals between the selected video frames. Additionally or alternatively, the selected video frames are key frames whose locations are specified by the frame address information, are key frames and the ranges of the available video frames that are not buffered may also include or may also be entirely delta frames, and/or are key frames and the specific video frames for which the metadata provides the frame address information include only key frames.

During a trick-play operation, while the moving playback position is moving through the portion outside of the normal buffer window, the media guidance application may (e.g., using the control circuitry of the client device) play the video content item in a trick-play playback mode using video frames only from the buffered subset.

In some embodiments, the media guidance application may also assemble the buffer for the video content item by repeatedly identifying ranges of video data in the stream to request and adding those ranges to the buffer. In such cases, the media guidance application maintains the normal buffer window comprises, during the assembling, iteratively identifying a next range of video data for the video content item that is not stored in the buffer and requesting the next range from the stream. The media guidance application also maintains the trick-play window comprises, during the assembling, iteratively identifying, in a sequence of video frames to be played during the trick-play playback mode, a next video frame that is not stored in the buffer, and requesting the next video frame from the stream.

In some embodiments, the media guidance application may also monitor streaming performance metrics, wherein the metadata describes a plurality of streams of the video content item, each stream having a different bitrate, determine from which stream, of the plurality of streams, to request particular frames of the selected frames in the trick-play window based at least on the performance metrics. Alternatively or additionally, the media guidance application may monitor streaming performance metrics, and determine how many video frames to select for the portion of the trick-play window based at least on the performance metrics. Alternatively or additionally, the media guidance application may monitor streaming performance metrics, determine an approximate time interval, relative to timestamps of the available video frames, between each video frame to select for the portion of the trick-play window based at least on the performance metrics, and select which video frames from the portion to buffer based on the approximate time interval.

In some embodiments, the media guidance application may select which video frames from the portion to buffer based on a playback rate of the trick-play operation or on an anticipated playback rate of the trick-play operation. For example, the media guidance application may expand the normal buffer window by re-using one or more frames in the trick-play window rather than streaming the one or more frames again, the expanding including requesting intervening frames, between the one or more frames, that were not buffered in the trick-play window.

In some embodiments, the media guidance application may maintain multiple trick-play windows of different sizes, each trick-play window optimized for a different playback rate and/or having a different frame quality or resolution. Alternatively or additionally, the media guidance application may create the trick-play window responsive to input requesting the trick-play operation. Alternatively or additionally, the media guidance application may create the trick-play window responsive to calculating that, based on a playback rate of the trick-play operation and current streaming performance metrics, the moving playback position will move outside of the normal buffer window during the trick-play operation. Alternatively or additionally, the media guidance application may create the trick-play window responsive to determining that a jump point indicated by the metadata is within a threshold temporal distance from the moving playback position. Alternatively or additionally, the media guidance application may create the trick-play window responsive to determining that a first jump point indicated by the metadata is within a threshold temporal distance from the moving playback position, wherein the portion in the trick-play window is bounded by a second jump point indicated by the metadata, and re-establish the normal buffer window at the second jump point, without the normal buffer window including the portion.

In some aspects, the media guidance application (e.g., implemented on the control circuitry of a client device or a network device) performs a trick-play operation with streaming media while the media is streaming. The client device may comprise non-transitory computer-readable media storing instructions that, when executed by one or more computing devices, cause performance of the functions discussed below. Likewise, the client device may be an apparatus comprising one or more subsystems collectively configured to perform the functions discussed below. For example, the media guidance application may identify a continuous sequence of video frames forming a video content item.

The media guidance application may (e.g., using the control circuitry of the client device) play each video frame in a first continuous portion of the sequence, in the order of the sequence, from a buffer in which the first continuous portion is stored (e.g., in the memory of the client device). In some embodiments, the media guidance application may fill the buffer by streaming video frames in the continuous sequence from a server over time. In some embodiments, the buffer comprises video frames downloaded from different streams, and the media guidance application may select from which stream, of a plurality of available streams for the video content item, to request particular video frames based on streaming performance metrics.

The media guidance application may receive (e.g., via an input device integrated into, or coupled to, the client device) input requesting a trick-play operation. In some embodiments, responsive to the input, the media guidance application may request at least particular frames in the subset of frames from one or more streams of the video content item on a streaming server, without requesting the missing ranges.

The media guidance application may (e.g., using the control circuitry of the client device) perform the trick-play operation over at least a second continuous portion of the sequence by playing only a subset of frames of the second continuous portion, without playing ranges of frames interspersed between each frame in the subset of frames, the subset of frames found in the buffer, the ranges of frames missing in the buffer. For example, each frame of the subset of frames is separated by at least one of the missing ranges within the sequence. Additionally or alternatively, an equal or approximately equal interval of frames may separate each frame of the subset of frames within the sequence.

Additionally or alternatively, the media guidance application may determine when to request particular frames within the buffer based on one or more of: whether the video content item is being played in a normal playback mode, a playback rate at which the video content item is being played at, a target amount of time of normal buffer time calculated as necessary to sustain smooth playback of the video content item in a normal playback mode, a target amount of trick-play buffer time calculated as necessary to sustain smooth playback of the video content item in a first trick-play playback mode, a target amount of trick-play buffer time calculated as necessary to sustain smooth playback of the video content item in a second trick-play playback mode, streaming performance metrics, and/or metadata indicating a frame at which a trick-play operation is predicted to begin or end.

In some aspects, the media guidance application (e.g., implemented on the control circuitry of a client device or a network device) performs a trick-play operation with streaming media while the media is streaming. The client device may comprise non-transitory computer-readable media storing instructions that, when executed by one or more computing devices, cause performance of the functions discussed below. Likewise, the client device may be an apparatus comprising one or more subsystems collectively configured to perform the functions discussed below. For example, the media guidance application may send, to a streaming server, one or more first requests for contents of a first video stream segment.

The media guidance application may (e.g., using the control circuitry of the client device) receive, in one or more responses to the one or more first requests, the entire first video stream segment, comprising a plurality of frames.

The media guidance application may (e.g., in memory of the client device) perform store the entire first video stream segment in a buffer. The media guidance application may (e.g., using the control circuitry of the client device) send, to a streaming server, second requests for specific frames of a second video stream segment, each second request requesting a single individual frame, the specific frames separated by ranges of frames. The media guidance application may (e.g., using the control circuitry of the client device) receive, in one or more responses to the second requests, the specific frames. The media guidance application may (e.g., in memory of the client device) store the specific frames of the second video stream segment in the buffer, without the ranges of frames. The media guidance application may subsequent to storing the specific frames of the second video stream segment in the buffer, and responsive to the current playback position of a video player that uses the buffer progressing closer to the second segment, may (e.g., using the control circuitry of the client device) send, to a streaming server, third requests for the ranges of frames of the second video stream segment, without requesting the specific frames already in the buffer. The media guidance application may (e.g., using the control circuitry of the client device) receive, in one or more responses to the third requests, the ranges of frames. The media guidance application may (e.g., in memory of the client device) store the entire second video stream segment in the buffer by inserting the ranges of frames between the specific frames.

In some embodiments, the media guidance application may play the first video stream segment at a normal playback rate, and while the ranges of frames are not found in the buffer, using the specific frames to play the second video stream segment at a faster-than-normal playback rate. In some embodiments, the media guidance application may the first video stream segment is from a stream having a different bitrate than the second video stream segment. In some embodiments, the media guidance application may select the specific frames based on one or more of: streaming performance metrics and/or a target amount of trick-play buffer time calculated as necessary to sustain smooth playback of the video content item in a trick-play playback mode. In some embodiments, the media guidance application may store third frames for a third video stream segment in the buffer, without storing third ranges of frames separating the third frames in the buffer, the second video stream segment and the third video stream segment of approximately equal lengths, the specific frames being approximately double in number compared to the third frames. In some embodiments, the specific frames are key frames, wherein the ranges of frames include delta frames.

In some aspects, the media guidance application (e.g., implemented on the control circuitry of a client device or a network device) performs a trick-play operation with streaming media while the media is streaming. The client device may comprise non-transitory computer-readable media storing instructions that, when executed by one or more computing devices, cause performance of the functions discussed below. Likewise, the client device may be an apparatus comprising one or more subsystems collectively configured to perform the functions discussed below. For example, the system may comprise one or more computer-readable media storing one or more buffers and a video player configured to play video content within the one or more buffers in accordance to a normal playback mode and at least one trick-play mode.

The system also comprises a streaming client configured to stream portions of a video content item from a server and assemble the portions within the one or more buffers as continuous video content for playback by the video player in the normal playback mode. In some embodiments, the streaming client is further configured to request metadata describing the video content item, the metadata including an index specifying locations of particular frames within the video content item, the trick-play optimizer identifying the individual frames by selecting the individual frames from the particular frames. In some embodiments, the individual frames may be key frames, and the individual frames are spaced at approximately equal time intervals relative to the video content item. In some embodiments, the continuous video content includes at least a first portion from a first stream of the plurality of streams followed by a second portion from a second stream of the plurality of streams.

The system may also comprise a trick-play optimizer configured to identify, in portions of the video content item that are not entirely stored within the one or more buffers, individual frames to download to support playback by the video player in the at least one trick-play mode, the trick-play optimizer further configured to cause the streaming client to stream the individual frames from the server and add the individual frames to the one or more buffers. In some embodiments, the trick-play optimizer is further configured to cause the streaming client to stream the individual frames from the server without streaming other frames in the portions of the video content item that are not entirely stored within the one or more buffers. Alternatively or additionally, the trick-play optimizer is further configured to cause the streaming client to stream the individual frames from the server without streaming other frames in the portions of the video content item that are not entirely stored within the one or more buffers. Alternatively or additionally, the trick-play optimizer and the video player are parts of the streaming client. Alternatively or additionally, the trick-play optimizer is further configured to identify the individual frames by identifying different trick-play windows to support different trick-play modes, the individual frames spaced at different time intervals within the different trick-play windows.

In some embodiments, the system may further comprise a performance monitor configured to generate performance metrics based on monitoring the streaming by the streaming client, wherein the server stores a plurality of streams of the video content item, each stream having a different bitrate, wherein the trick-play optimizer is configured to determine from which stream, of the plurality of streams, to request particular frames of the individual frames based at least on the performance metrics and on a playback rate of the trick-play mode.

In some embodiments, the system may further comprise a performance monitor configured to generate performance metrics based on monitoring the streaming by the streaming client, wherein the trick-play optimizer is configured to determine an approximate time interval, relative to timestamps of video frames in the video content item, between which to select each identified individual video frame, based at least on the performance metrics and on a playback rate of the trick-play mode.

In some embodiments, the streaming client is further configured to, after having added the individual frames to the one or more buffers, expand the continuous video content to include portions in which the individual frames reside by requesting intervening frames between the individual frames without re-requesting the individual frames.

In some embodiments, the trick-play optimizer is further configured to cause the streaming client to request the individual frames responsive to at least one of: input requesting the trick-play mode, determining that a jump point indicated by metadata for the video content item is within a threshold temporal distance from a playback position of the video player, or calculating that, based on a playback rate of the trick-play mode and current streaming performance metrics, the playback position will move beyond the continuous video content during the trick-play mode. Alternatively or additionally, the trick-play optimizer is further configured to instruct the streaming client to begin requesting new portions of the video content item beginning at a predicted jump point, without having requested entire portions of the video content item in which the individual frames reside, the new portions assembled as new continuous video content for the video player to play upon returning to the normal playback mode.

In some embodiments, the system comprises a proxy server configured to generate metadata describing the video content item, the metadata specifying address information for particular frames, including the individual frames, wherein the streaming client is configured to request the metadata from the proxy server; wherein the trick-play optimizer is configured to use the metadata to identify the individual frames, and wherein the server is either a streaming server configured to serve one or more streams for the video content, or the proxy server, configured to relay requests from the streaming client to the streaming server. In some embodiments, the server is an HLS-compatible server and the streaming client is an HLS client.

BRIEF DESCRIPTION OF THE DRAWINGS

The present inventive subject matter is illustrated by way of example, and not by way of limitation, in the figures of the accompanying drawings and in which like reference numerals refer to similar elements and in which.

DETAILED DESCRIPTION

Figure 1:
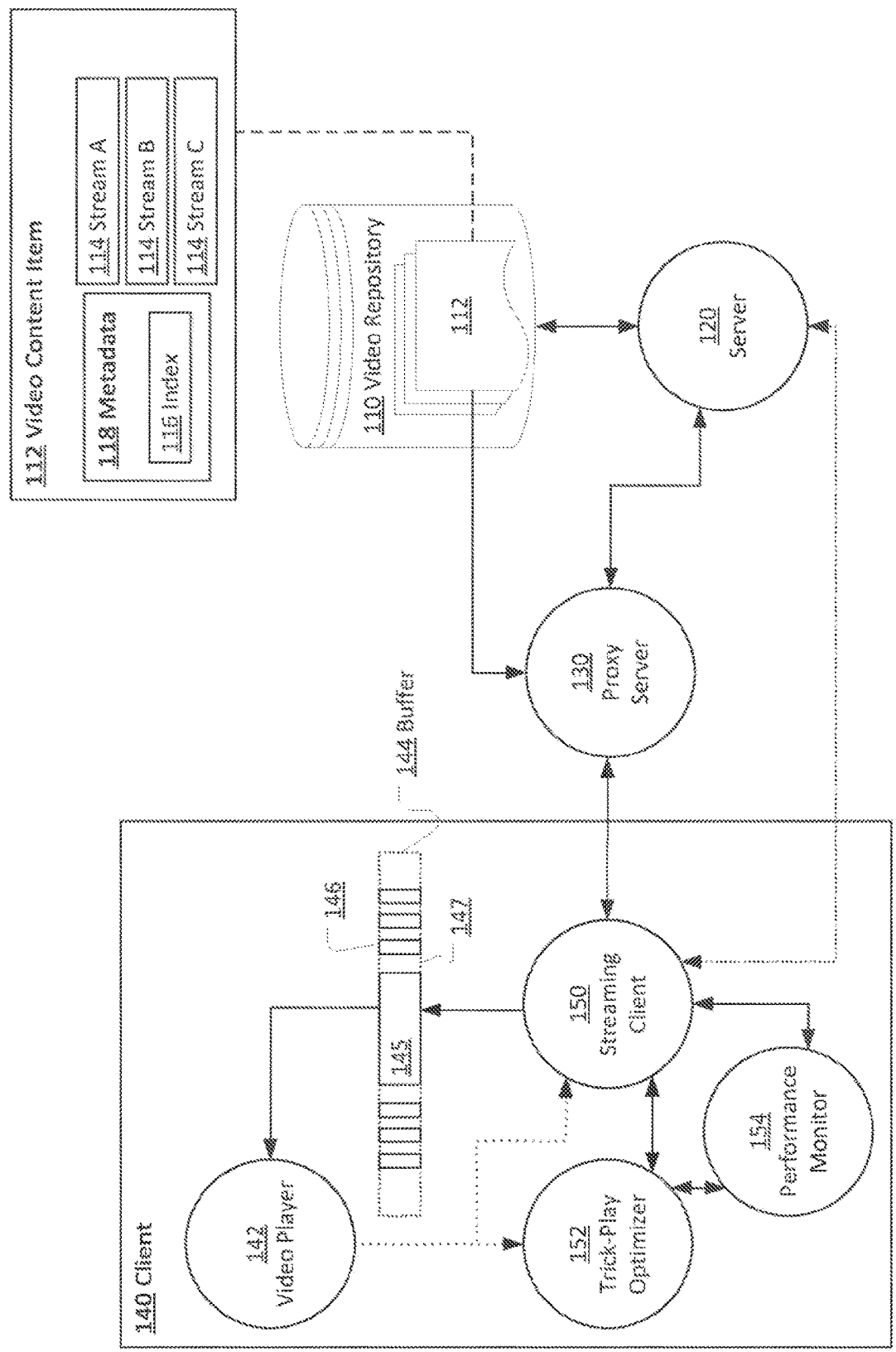
FIG. 1 is an illustrative view of various aspects of an example system in which the techniques described herein may be practiced.

In the following description, for the purposes of explanation, numerous specific details are set forth in order to provide a thorough understanding of the present inventive subject matter. It will be apparent, however, that the present inventive subject matter may be practiced without these specific details. In other instances, well-known structures and devices are shown in block diagram form in order to avoid unnecessarily obscuring the present inventive subject matter.

Embodiments are described herein according to the following outline:
1.0. General Overview
2.0. Structural Overview
2.1. Video Content Items
2.2. Video Repository
2.3. Indexes
2.4. Streaming Server
2.5. Proxy Server
2.6. Video Player
2.7. Streaming Client
2.8. Performance Monitor
2.9. Trick-Play Optimizer
2.10. Miscellaneous
3.0. Functional Overview
3.1. General Flow
3.2. Alternative Flow
3.3. Trick-Play Buffer Progression
4.0. Implementation Examples
4.1. Illustrative Buffer Examples
4.2. Example Index
4.3. Quick-Play
4.4. Skip Mode
4.5. Proxy Client
5.0. Implementation Mechanism—Hardware Overview
6.0. Extensions and Alternatives
1.0. General Overview Approaches, techniques, and mechanisms are disclosed for providing enhanced trick-play modes for video content that is being streamed to a client from a server. According to an embodiment, the enhanced trick-play modes involve playing the stream in a faster-than-real-time modes in which frames nonetheless frequently update, so as to assist a viewer in more accurately positioning the stream, particularly at higher and higher fast forward or rewind "rates." In an embodiment, the enhanced trick-play modes are provided with relatively low latency and high quality using trick-play optimization techniques for a streaming environment, avoiding the need to stream the entire contents of the portions through which the viewer is fast forwarding.

Content streamed over wide area networks, such as a consumer-grade broadband Internet connection or a cellular network, is particularly likely to experience non-uniform latency and bandwidth characteristics that would normally reduce the perceived quality of the trick-play playback experience. However, in accordance with the described techniques, by employing sophisticated selection criteria of which parts of the content to download at what time, the quality of the playback experience is improved versus that which would conventionally be possible when using a simple sequential frame data download.

According to an embodiment, a streaming client may be configured to deliver a "best effort" trick-play presentation of a stream by skipping over and/or ignoring partial video content portions that do not arrive "in time." This late-arriving content is called "irrelevant content," and skipping over or ignoring the irrelevant content allows the client to hide network latency issues during trick-play operations.

According to an embodiment, a streaming client may maintain a cache of nearby significant frames, such as nearby key frames, in forward and/or reverse directions of the current playback position, without having to download the entire portions of the video stream in which the significant frames reside. The client may use the standalone frames in the cache to support playback of the stream in trick-play modes, even if only partial portions of the video content have been cached at the time such playback is requested, thereby allowing a smoother and more immediate transition from regular playback speed to trick-play playback speeds. In an embodiment, such a cache may also or alternatively be utilized to discontinuously reposition the video stream to a new location that is "near" the current playback presentation point. This allows better skipping operations forward or backwards by a fixed amount of time, for example.

According to an embodiment, a streaming client may cache content associated with "nearby" or "likely" jump points at pre-specified time offsets within a video content item. These points may be of interest, for example, when beginning or continuing video playback. The content consumption experience may provide the viewer with an interface to reposition the playback of content to a jump point that is discontinuous with respect to the current content playback position.

According to an embodiment, a streaming client and server may utilize more advanced, ahead-of-time indexing of video content to provide better access to video frames in non-sequential orders for trick-play mode presentation.

According to an embodiment, a streaming client uses content index information to anticipate the overall bitrate of the subset of the content to be downloaded by the client for trick-play presentation, which will generally be higher and more variable than the overall bitrate of the entire content, due to the nature of encoding algorithms. The client may use any combination of various approaches in order to achieve a smoother trick-play experience. For example, the client may adjust the rate at which playback frames are displayed gradually enough so as not to appear jerky to the user perception. As another example, the client may pick different frames within the content stream to download than would normally be dictated by a simple content-to-playback rate ratio (e.g. in the case that a particular play speed does not require every key frame to be displayed). As another example, the client may download higher bit size frames from a lower quality (and thus lower overall bitrate) stream of the video content item, and lower bit size frames from a higher quality (and thus higher overall bitrate) stream of the video content item. As yet another non-limiting example, the client may download higher bit size frames out of sequential order prior to when they would have otherwise been downloaded, in order to avoid buffer underflow at a later point in the download process. More generally, streaming decisions may be made on a frame-by-frame, basis and may make use of achieved download latency, bandwidth information from past downloaded frames, and/or knowledge of future frame bit size information.

According to an embodiment, a streaming client may utilize multiple network channels to download content, improving the viewer's experience both by allowing overlapped downloads and by allowing faster abandonment of irrelevant content. According to an embodiment, a streaming client is configured to adjust to utilizing differing bitrate versions (streams) of the video content item, both for normal playback modes and trick-play modes, to reduce network needs and maintain higher quality, faster-than-real-time playback.

According to an embodiment, certain conventional streaming servers may not support various metadata, streams, and/or other features necessary to enable certain functionality described herein. In an embodiment, a "proxy" server deployed between the streaming server and the client may be configured to support the necessary functionality instead. This proxy server wraps any traditional server (or servers), adding additional indexing functions and application programming interfaces ("APIs") that provide the trick-play support defined herein. The proxy server provides a relatively simple transition path to add enhanced trick-play functionality without requiring completely new content infrastructure.

In other aspects, the inventive subject matter encompasses computer apparatuses and computer-readable media configured to carry out the foregoing techniques.

2.0. Structural Overview

Techniques described herein relate to items of video content. Video content items may be of any type or types of video programming. For example, a given video content item may be a movie, an episode of a television show, a recording of a sports or other type of event, a home video, a "short" film, a music video, a commercial, a teaser, a user-uploaded video, clips or other portions of any of the foregoing, or any other type of video programming 2.1. Video Content Items Video content items are embodied within the described systems as electronic data for representing video content, taking any suitable electronic form. The electronic data includes, among other elements, video data. Generally, the video data describes a sequence of individual video frames to be displayed, in normal playback mode, in rapid succession one after another. Each video frame comprises an at least two-dimensional grid of pixels, and the electronic data indicates the manner in which each pixel in the video frame is to be displayed (e.g. the color of the pixel). Certain electronic forms, known as raw video formats, may specify appearance attributes for each and every pixel for each and every video frame. Other forms may use various lossless or lossy compression schemes to reduce the amount of electronic data needed to represent the video data. Example formats may include, without limitation, MPEG, MPEG-2, H.264/MPEG-4 AVC (hereinafter "H.264"), and so forth.

In certain electronic forms, video data is represented using a convention in which certain video frames, known as "delta frames" or "predicted frames" are described in terms that refer to other frames, known as "key frames" or "reference frames." For instance, a delta frame might simply describe a pixel, or region thereof, as being the same as in a certain reference frame, or differing from the reference frame in only a specific aspect. The data describing the delta frame can thus be very small, but the delta frame can only be reconstructed if data describing the reference frame(s) to which the delta frame refers is also available. In many such video formats, the reference frames are known as I-frames, which are coded without reference to any frames but themselves, while the delta frames are known as P-frames or B-frames.

Reference frames are interspersed throughout the video data (e.g. every three frames, every fifteen frames, every three-hundred frames, etc.). In some embodiments, reference frames need not be found at any specific frequency within the sequence of frames, but nonetheless are found with some regularity. In some formats, video data is organized using a repeating structure, such as a group of pictures ("GOP"). Each structure begins with a reference frame, followed by a specified number of delta frames. In certain formats, each delta frame within such a repeating structure refers only to the reference frame at the beginning of the structure. In other formats, delta frames may refer to other reference frames besides the immediately preceding reference frame, including subsequent reference frame(s).

The electronic data representing a video content item may further comprise electronic audio data describing audio signals to reproduce at various times while the video content item is played. Example electronic forms that are suitable for storing audio data include, without limitation, WAV, AC-3, PCM, MP3, FLAC, AAC, WMA, and so forth. The electronic data may yet comprise other types of data, including without limitation subtitles, metadata, and so forth.

The video data, audio data, and any other components of a video content item may be stored and/or transmitted together in one or more video item containers. A variety of suitable container types exist for the video data and audio data. In an embodiment, a transport stream, such as an MPEG transport stream, or a program stream may be utilized for storing and/or transmitting the video data and/or audio data, and certain techniques described herein may provide particular advantages with respect to such container formats. Other example container formats may include, without limitations, AVI, MOV, MKV, and MP4. In some embodiments, within such containers, the video data, audio data, and other components of the video content item may be divided into small sections known as "packets." Packets for different types of data (e.g. video data packets and audio data packets) may be interleaved together within the container such that portions of the audio data, video data, and any other data that are to be played concurrently are stored within packets that are in close proximity within the container. In other embodiments, video data and audio data may be stored in separate containers, and/or in entirely separate sections of a single container.

A video content item typically has a defined target frame rate for a normal playing mode. This defined frame rate is the number of frames in the sequence of frames that will be displayed per a given unit of time when the video content item is playing in its intended form. Common frame rates include, without limitation, 24 frames per second, 29.97 frames per second, 60 frames per second, etc. Certain content items may have a variable frame rate, wherein different segments of the content item are assigned different frame rates.

In an embodiment, multiple alternate representations of the video data and/or audio data may exist for a video content item. Each alternate representation may comprise, for example, differently formatted video data and/or differently formatted audio data. For example, there may be a high quality version of the video data, medium quality version of the video data, low quality version of the video data, and/or any other number of different versions of different qualities. The versions may differ because, for example, they were encoded using different video frame dimensions, compression levels, compression schemes, reference frame frequencies, and so forth.

These differences may produce video data and/or audio data having different encoding bit rates. The encoding bit rate of a given segment of data is the number of bits used to represent the segment per some unit of intended playback time. For example, certain video data may be intended to be played at a frame rate of sixty frames per second. The encoding bit rate, in terms of bits per second, would thus be the number of bits needed to represent sixty frames. The encoding bit rate may be constant, in that the bit rate is substantially constant throughout the encoded data, or the bit rate may be variable, in that the bit rate varies throughout the encoded data. The encoding bit rate for a variable bit rate content item is considered to be the average encoding bitrate for all of the encoded data.

Differently formatted representations of the video data and/or audio data may be stored in separate containers. For example, there may be multiple transport streams for a single video content item, each transport stream having a different bit rate. For ease of explanation, each of the different representations available for a given video content item may be referred to herein as
being a separate stream or video stream, though it will be recognized that in some embodiments the representations may be stored in containers that are not necessarily transport streams. Moreover, in some embodiments, different representations of a video content item may be provided within a same container, as a separate track of audio data, video data, subtitle data, etc.

In some embodiments, system 100 may comprise a video transcoder (not depicted) that generates differently formatted representations for a video content item from an original representation. The video transcoder may generate such representations as a background process for certain specified bitrates or other formats. The video transcoder may also or instead generate such representations on demand.

In other embodiments, different representations of the video data may exist for a variety of other reasons, such as to support playback on systems that cannot understand a preferred format, to support different languages, to provide alternate content with different endings or edited content, and so forth. These representations may be provided in separate containers, as discussed above.

2.2. Video Repository

FIG. 1 is an illustrative view of various aspects of an example system 100 in which the techniques described herein may be practiced, according to an embodiment. System 100 comprises one or more computing devices. These one or more computing devices comprise any combination of hardware and software configured to implement the various logical components described herein, including components 110-140. For example, the one or more computing devices may include one or more memories storing instructions for implementing the various components described herein, one or more hardware processors configured to execute the instructions stored in the one or more memories, and various data repositories in the one or more memories for storing data structures utilized and manipulated by the various components.

System 100 comprises various components configured to store, transmit, receive, or process video content, such as video content items 112. For example, system 100 comprises one or more video repositories 110 storing multiple discrete video content items 112. A video repository 110 may comprise any suitable means for storing containers for the video content items 112. For example, video repository 110 may comprise a file system in which a given video content item 112 is stored as one or more addressable files on one or more storage devices. As another example,
video repository 110 may comprise a database system in which a given video content item 112 is stored as one or more records or binary large objects on one or more storage devices.

Each video content item 112 has at least one stream 114. In an embodiment, some video content items 112 may have multiple streams 114 corresponding to differently formatted representations of the video content items 112, as described previously. In an embodiment, video repository 110 may store a master playlist, manifest, or other metadata 118 identifying each stream 114 available for a content item 112 as well as information about each stream 114. In an embodiment, the metadata 118 optionally includes information such as average bit rate for each stream 114, frame resolution for each stream 114, video stream location for each stream 114, audio stream location (if separate), and so forth.

In an embodiment, a container in which data for a video content item 112 is stored may be subdivided into a plurality of segments within video repository 110. Each segment may be, for example, a different file or record. For instance, if the video content item 112 is encoded within an MPEG-2 transport stream, the transport stream may then be broken into multiple discrete segments, with each segment stored within video repository 110 as a different and separately addressable .ts file. In an embodiment, each segment is no greater in size than a certain predefined size (e.g. a certain amount of time), which may the same for each stream 114 of the video content item or even all content of video repository 110.

According to an embodiment, some or all of video content items 112 in a video repository 110 may be "live" content rather than stored video-on-demand. Live content is provided as input to an encoder component (not depicted), where it is dynamically encoded into streams 114. New segments of the streams 114 are continually added as new live content arrives, and metadata 118 is updated accordingly.

2.3. Indexes

In some embodiments, system 100 optionally comprises a certain type of metadata 118 known as indexes 116 for some or all of the video content items 112 in a video repository 110. Various types of indexes 116 may exist, depending on the embodiment. An index 116 may be specific to a stream 114, a stream segment, or more generally applicable to an entire video content item 112, depending on the index type and/or embodiment.

According to an embodiment, a container for a video content item 112 may contain an index 116 directly, or reference a separate location in which the index 116 is located. For example, an index 116 may be found within a file stored at a particular Uniform Resource Indicator (URI) on the same server as the corresponding stream, or a different server. The server may include header information or other metadata that identifies this URI. Or, a separate database or table may map the stream to the index 116.

In an embodiment, an index 116 is formatted as a media playlist. Such a playlist may normally identify segments (e.g. such as locations of transport stream segments for a particular stream of a video content item 112). In an embodiment, a master playlist for a stream may specify links to the various playlists for various types of indexes.

In an embodiment, video repository 110 may optionally be coupled to an index generator that automatically generates indexes 116 for some or all of the streams of some or all of the video content items 112. For example, indexes may be generated by a background process, during an import process, and/or as needed to service requests for video contents. In other embodiments, indexes 116 may be generated in advance of storage within the video repository 110.

Frame Index

A frame index 116, which is another example of an index 116 that may be provided, provides, among other aspects, addressing information for certain frames within a corresponding video stream 114. For example, an index 116 may include a byte offset at which the data describing each key frame in a video stream 114 may be found, relative to the start of the video stream 114. Or, the index 116 may include, for each key frame, a segment file name and a byte offset at which the data describing the key frame may be found relative to the start of the segment file name. A variety of other addressing conventions may be used in the alternative. In an embodiment, the address information may further include information indicating a length or size of the key frame, such as a number of bytes in the key frame, or an ending byte offset for the key frame.

Although in some embodiments, a frame index 116 includes address information for all key frames in the stream, in other embodiments, the index 116 may only include address information for some key frames. For example, the index 116 may include address information for every alternate key frame, for one key frame per given unit of time, for only certain types of key frames, and so forth. In an embodiment, there may be multiple frame indexes 116 for a single stream 114, each corresponding to a different segment of the stream 114. Note that, for video
content items having multiple streams 114 corresponding to differently formatted representations of the video content item, each stream may have its own frame index 116 or indexes 116.

In an embodiment, a tag, such as # EXT-X-I-FRAME-STREAM-INF, might be used to designate a certain playlist as a key frame playlist, in which each identified segment is a single key frame.

Trick-Play Indexes

An embodiment, an index 116 may further include addressing information for frames other than key frames. For example, the index may include addressing information indicating the boundaries of one or more delta frames, along with an indication of which key frame(s) are referenced by the delta frames. For instance, the index may include addressing information for approximately every third frame, regardless of what type of frame the third frame may be. Such may be useful, for example, if key frames are spaced too sparsely to by themselves support certain trick-play modes described herein. In an embodiment, an index 116 may include addressing information for all frames. In an embodiment, there may be multiple indexes 116, each providing a playlist for a different trick-play mode (e.g. 2× fast forward, 3× fast forward, etc.).

Audio Indexes

In an embodiment, an index 116 may be created for audio data within a stream 114, so as to enable download of only the audio data within streams whose audio and video data are interwoven together (e.g. using interleaved packets). Inversely, an index 116 may be created to identify only the video data within a stream 114. Or, a combined index 116 may indicate which sections are audio data and which sections are video data.

Jump Points

In an embodiment, video repository 110 may optionally include metadata 118 describing "jump" points within a content item 112, which may, for example, be in the form of yet another type of index 116. A jump point is a location within a content item, identified by a timestamp and/or frame identifier, at which a viewer is likely to request a trick-play mode. Optionally, if video content items 112 do not already include data describing jump points, system 100 may include a component coupled to video repository 110 that generates the jump points as background process, upon importation into video repository 110, and/or upon demand.

Jump points may be determined programmatically, for example, by analyzing streams 114 for metadata describing chapters or other special markers, or by analyzing the actual frames in streams 114 using scene and/or commercial detection algorithms. Jump points may also or instead be determined based on logs indicating timestamps or frames at which clients, such as clients 140, have entered certain trick-play modes. The component generating the jump points may receive such logs directly from the clients, generate such logs based on implicit observations from streaming server 120 or proxy server 130 (e.g. a client appears to be requesting frames in a manner optimized for a trick-play operation beginning with a certain frame), or receive such logs from another server configured to collect events and other data from the clients. The most common logged timestamps or frames may be jump points, and/or a cluster of close timestamps in the logs may be averaged or otherwise statistically analyzed to identify a specific jump point for the cluster.

In an embodiment, jump points may be generated by another component and/or entity, using either manual tagging or similar automatic techniques, and then uploaded to video repository 110 or proxy server 130.

In an embodiment, there may be different types of jump points. For example, a jump point may indicate whether it is a common jump point for entering a trick-play mode, or for exiting a trick-play mode. Also, a jump point may indicate the specific type of trick-play mode that is usually entered at the jump point (e.g. 30 second skip, 2× fast-forward, 10× fast-forward, etc.).

2.4. Streaming Server

System 100 further comprises one or more streaming servers 120 coupled to the video repository 110 directly or via one or more networks. A streaming server 120 may comprise any combination of computing hardware and software configured to implement the functionality of streaming server 120 described herein. As used herein, the term "server" may refer to a component implemented by a single computing device, or to a group of similar or complementary components on potentially multiple computing devices, working in concert to provide the various functionalities described of that server. A streaming server 120 may be implemented on the same computing device or devices as video repository 110, or on a different computing device or devices.

Streaming server 120 receives requests for specific data, and responds with the requested data. Depending on the embodiment, the data may include streams 114 or portions thereof, metadata describing video content items 112, indexes 116, or any other data stored within video repository 110. Each request identifies the requested data by some identifier, such as a URI, that the streaming server recognizes as uniquely identifying the requested data. For example, if a requested stream 114 is stored in an individual file, the URI may include information such as the server name of the streaming server, a folder or hierarchy of folders in which a particular video content item 112 is stored, and a file name of the stream 114. Of course, a wide variety of addressing schemes may similarly be utilized, depending on the embodiment. The server locates the requested data in a video repository 110, reads the requested data, and returns the requested data to the requestor.

Streaming server 120 does not send an entire video content 112 at once, but rather sends discrete portions, such as a packet or group of packets, in response to successive requests for the video content 112. For example, streaming server 120 may respond to an initial request for a stream 114 with a first portion of the stream 114. The requester may send another request for a next portion, and the streaming server 120 may respond with the next portion. This process may continue until the end of the stream 114 is reached or the requestor stops sending requests for the stream 114. For convenience, this disclosure may refer at times to a process of a server sending or streaming a video content item 112 to a client, or, inversely, a client downloading, receiving, or streaming video content item 112 from a server. It will be recognized that this process may include responding to multiple requests from the client for portions of one or more streams of the video content item 112, and the entire video content 112 need not necessarily be sent in the course of the sending.

In an embodiment, streaming server 120 is configured to accept and respond to requests for specific portions of, or partial contents of, a stream 114. For example, streaming server 120 may accept "byte range" requests that identify not only a stream 114 of requested content, but a specific portion of that stream 114 to return. The specific portion may be identified, for example, by a byte offset specified within the request, relative to the beginning of the stream 114 (or to the beginning of a file segment within the stream 114). The specific portion may optionally be further identified by information indicating the length of the desired portion (e.g. a number of bytes). According to an embodiment, streaming server 120 may include, in some or all responses for video data, various metadata such as the total length of a stream 114, an indication of whether there is any more content remaining and/or how much content is remaining, a location within the stream 114 corresponding to the data included in the response, and so forth.

According to an embodiment, streaming server 120 is configured to recognize and respond to requests in a manner that is substantially compliant with the Hyper-Text Transport Protocol (HTTP). Requests for content may therefore be, for example, HTTP GET requests, while responses take the form of HTTP responses. Byte range requests may be specified using a Range request header (e.g. as described in RFC 7233).

In an embodiment, streaming server 120 may more specifically comply with a HTTP Live Streaming (HLS) protocol for streaming media (e.g. as described in Pantos, R. P., April 2016, "HTTP Live Streaming draft-pantos-http-live-streaming-19", Network Working Group, the entire contents of which are hereby incorporated by reference for all purposes as if set forth herein). Each video content item 112 comprises a master playlist in an .m3u8 format that specifies location information for multiple different streams 114 encoded as MPEG-2 transport streams. The video content item 112 is divided into multiple time periods (e.g. ten-second intervals), and each stream has a segment for each time period. The master playlist includes the location of each segment file within each stream 114. The streaming server 120 is configured to work in coordination with a streaming client to adaptively select a stream 114 of optimal bitrate to send to the streaming client based on detected network conditions and/or other factors. The exact stream 114 being sent to the streaming client may change "mid-stream," while the client is playing the video content item 112.

In other embodiments, the streaming server 120 may be configured to support other streaming media protocols, such as MPEG-DASH, Microsoft Smooth Streaming, Adobe HTTP Dynamic Streaming, and so forth, potentially utilizing other underlying protocols, such as Real-time Transport Protocol, and Real-Time Streaming Protocol. However, while the techniques described herein provide advantages regardless of the protocol utilized, the techniques described herein may provide certain additional advantages when utilized with streaming server 120 for HLS-based streaming, relative to other protocols.

According to an embodiment, streaming server 120 may in some cases serve streams 114 that is being transcoded dynamically, in response to the stream 114 being requested. Information instructing the streaming server 120 as to the original stream 114 that should be transcoded, as well as to what format should be used for the transcoding, may be specified, for example, in the request to the streaming server 120. Streaming server 120 may include a transcoding component, or be coupled to a transcoder.

2.5. Proxy Server

According to an embodiment, the techniques described herein may be utilized with conventional streaming servers 120, also referred to as origin servers, which do not provide some or all of the necessary streams 114, indexes 116, and/or other metadata 118 to enable certain techniques described herein. To accommodate certain techniques described herein that rely upon data and/or functions not typically supported in conventional streaming servers, system 100 may optionally include one or more proxy servers 130 deployed in front of streaming server 120.

Proxy servers 130 may comprise any combination of computing hardware and software configured to implement the features of proxy server 130 described herein. A proxy server 130 is communicatively coupled to one or more streaming servers 120. For example, a proxy server 130 may communicate with a streaming server 120 via one or more networks, such as a local area network or the Internet. A proxy server 130 may be implemented on the same computing devices as a streaming server 120, or on different computing devices. A proxy server 130 may furthermore be part of the same server system as a streaming server 120, or a different server system operated by a potentially different entity.

A proxy server 130 has access to some or all of the content in video repository 110, either directly via a file system or database system interface, or indirectly via streaming server 120. The proxy server 130 may access video content items 112, analyze those items 112, and generate various data structures needed for techniques described herein, such as streams 114, indexes 116, and/or other metadata 118. For instance, the proxy server 130 may utilize a manifest for the video content item 112 to identify each stream 114 available for the items 112. The proxy server 130 may then access and parse each stream 114 of a video content item 112 to identify key frames found therein, and generate an index 116 (and optionally other metadata 118) for each stream 114 accordingly. As another example, the proxy server 130 may determine that a certain stream 114 is needed for a content item 112 (e.g. a separate "quick-play" audio stream, or a differently formatted version of the content item 112), and accordingly generate the stream 114 for local storage at the proxy server 130. The proxy server 130 then creates new metadata 118, such as an updated manifest or master playlist for the item 112, that indicates that the new stream 114 is also available for the content item 112 directly from the proxy server 130.

The proxy server 130 may store the data it generates in its own repository 135, in association with various identifiers that indicate for what video content items 112 and/or streams 114 the content was generated. The proxy server 130 may generate such data proactively by, for example, monitoring video repository 110 for new items 112 and/or streams 114, and queueing the items 112 or streams 114 for processing once detected. Or, the proxy server 130 may generate some or all of the data upon demand, such as the first time the data is requested.

A proxy server 130 receives requests for content. For certain requests, the proxy server 130 may access and return data directly, such as in response to requests for any streams 114, indexes 116, or metadata 118 that proxy server 130 generates. For other requests, the proxy server 130 may forward the requests to the streaming server 120, and then relay results returned from the streaming server 120 back to the requestors. The proxy server 130 may, for example, be configured to receive requests that conform the same protocols as the requests that streaming server 120 is configured to receive, such as HTTP and/or HLS.

For example, the proxy server 130 may receive a request for a playlist or manifest for a video content item 112 having a certain identifier. The proxy server 130 may return a manifest, generated and/or modified by the proxy server 130, that identifies a number of streams 114 available for the video content item 112 as well as various other metadata 118. This metadata 118 may include, for example, the location of an index 116 for each stream 114. The proxy server 130 may subsequently receive, from the same requestor, a request for some or all of these indexes 116, which the proxy server 130 serves directly on account of having generated the indexes 116. The proxy server 130 may also receive a request for a one or more portions of one or more streams 114, which the proxy server 130 relays to the streaming server 120. Or, requests for some or all portions of the one or more streams 114 may instead be directed (based on link data within the manifest) directly to the streaming server 120, without being relayed through the proxy server 130.

In an embodiment, proxy server 130 may generate or identify jump points in any of
the manners described above.

Proxy Streams

Optionally, the proxy server 130 may translate or otherwise manipulate certain requests before forwarding the manipulated requests to the streaming server 120. For example, in an embodiment, proxy server 130 may have generated metadata 118 that reports a certain stream to exist, when the stream does not in fact exists. Rather, the proxy server 130 may have generated mapping information that maps segments of this "proxy" stream, to segments within a stream 114 actually stored in video repository 110.

For example, a video content item 112 may not have an audio-only stream 114, but rather audio data may be interleaved with video data in each stream 114. However, an audio-only stream may be useful for various purposes, such as for enabling a "quick play" mode as described subsequently. The proxy server 130 may analyze a stream 114 and identify each section of audio data within the stream 114. The proxy server 130 may then generate a mapping of addressable "proxy" audio data to the identified sections within the actual stream 114. For instance, bytes 01000 of the proxy audio stream may be mapped to bytes 750-1750 of the first segment of the actual stream 1114, while bytes 1001-1500 might be mapped to bytes 801-1300 of the second segment of the actual stream 1114. The proxy server 130 then reports in, for example, the master playlist for the item 112, that an audio-only stream exists at proxy server 130. Similar techniques may be utilized to create other types of proxy streams, such as video-only proxy streams, proxy keyframe streams comprised of only key frames, or proxy trick-play streams comprising frames that are specific to certain trick-play modes (e.g. 2× rewind, 3× rewind, 2× fast forward, thirty second skip, etc.).

A requestor may request a chunk of a proxy stream from the proxy server 130. The proxy server 130 may determine, based on the generated mapping, a number of segments in one or more streams 114 from which the contents mapped to this chunk may be obtained. The proxy server 130 may issue its own request(s) to obtain these segments from streaming server 120. For example, the proxy server 130 may determine that a chunk of a pseudo audio stream is found in ten different sections of a stream 114, and make ten ranged HTTP get requests to retrieve these distinct sections. The proxy server 130 may concatenate the data returned from the streaming server 120, and/or trim away irrelevant data (e.g. non-audio data in the case of a proxy audio stream, or non-key frame data in the case of a trick-play stream) to produce the requested chunk of data for the proxy stream. The proxy server 130 may optionally cache or permanently store the chunk for future requests.

2.6. Video Player

System 100 further comprises a plurality of clients 140 coupled to streaming server 120 and/or proxy server 130 via one or more networks, such as the Internet. A client 140 may be any of a variety of types of computing devices, including, without limitation, digital video recorders or other set-top boxes, media playback devices, desktop computers, laptop computers, gaming consoles, televisions, tablets, smartphones or other mobile devices, and so forth.

Client 140 includes a number of components, which may be implemented by any combination of software-based instructions and hardware-implemented logic. For example, client 140 includes a video player 142. Video player 142 is configured to play video content items 112 by presenting the represented video and audio contents on one or more output devices. It will be understood that the acts of "presenting," "displaying," or "playing" a video content item, as used herein, may refer either to the physical act of manipulating a display screen to depict video frames (and optionally reproducing audio signals) represented by at least a portion of the video content item, as may be performed by a monitor device and speakers, or to the act of sending instructions to other components, such as graphics drivers and/or or media hardware, that instruct those components to present, display, or play the video content item, depending on the embodiment and client type.

To play a video content item 112, video player 142 reads and interprets video data and audio data for video content items 112 that have been stored at least temporarily at client 140 in a buffer 144. Buffer 144 may be a structure or multiple structures in allocated storage spaces on any suitable media for storing electronic data, including volatile memory devices and non-volatile memory devices. Buffer 144 need not necessarily store an entire stream 114, but rather at any given time while a video content item 112 is playing, buffer 114 may store only certain portions of one or more streams 114 that contain contents that are within a certain temporal vicinity of a current playback position, recent playback positions, and/or predicted future playback positions. As playback continues, additional contents may be loaded into buffer 144 by a streaming client 150, while contents that have already been played may be removed after a certain amount time to reduce the amount of space needed for the buffer 144.

Video player 142 typically plays a video content item 112 in a normal, linear playback mode. This may mean, for example, that video player 142 displays the video data 112 at a prescribed framerate for the video content item 112, each frame being displayed sequentially, one after another, in the order prescribed by the stream 114 of the video content item 112 that is being played. The rate at which the video player progresses through the timeline of a video content item is known as the playback rate, and the normal playback rate is such that each frame of the video content item is displayed at the prescribed framerate.

According to an embodiment, as a result of adaptive streaming techniques described herein, the video data stored in buffer 144 may have been assembled from different streams 114 corresponding to different resolutions or bitrates. For example, different segments, GOPs, frames, or other discrete portions of the buffer 144 may have been downloaded from differently formatted streams 114 of the currently playing video content item 112. Accordingly, video player 142 is configure to dynamically adapt to playing video data with different properties. This may require, for example, upscaling or downscaling contents, or performing other video processing operations.

Trick-Play Modes

Video player 142 may also be configured to receive and respond to command input while playing a video content item 112. Certain command inputs may instruct the video player 142 to begin playing the video content item 112 in a trick-play mode, typically from the current playing position. Example trick-play modes include rewinding, fast-forwarding, pausing, and slow motion. Each mode may have a number of variants. For example, a fast-forward mode may include a 2× fast-forward mode where the video content item 112 is played at twice its normal playback rate, a 3× fast-forward mode where the video content item 112 is played at thrice its normal playback rate, an 8× fast-forward mode where the video content item 112 is played at eight-times its normal playback rate, and/or fast-forward modes corresponding to any other numerical factor. Similar variants may exist for rewinding modes. Yet other command inputs received while in a fast-forward, rewind, or slow motion mode may instruct the video player 142 to resume playing the video content item 112 at a normal rate.

The simplest and most conventional way to play a video content item 112 while in a trick-play mode would simply be to change the framerate at which the frames are displayed to match the playback rate of the trick-play mode, such that each frame is displayed for a shorter amount of time. However, during fast-forward and rewind playback modes, it may not be possible for video player 142 to actually play each frame of a stream 114 at the framerate that would correspond to the mode. One of the many reasons for this limitation is that output display devices are typically incapable of actually displaying individual frames for only the short durations of times that the higher framerates would require for trick-play playback modes. A video player 142 may therefore utilize a conventional trick-play technique of displaying each frame for a duration of time that is actually supported by the output device, but skipping display of certain frames, such the frame played at any given time is approximately equivalent to the frame that would have been displayed at that time if the video player 142 had been capable of actually displaying the stream 114 at the framerate that corresponds to the playback rate. In an embodiment where a display supports a framerate no faster than that of the default framerate for the video content item, a 2× fast-forward mode may, for example, require skipping every other frame, while a 4× fast-forward
mode may require skipping three out of every four frames. A rewind mode would be provided similarly, except that frames would be played in reverse.

In certain playback modes, because only a certain portion of a stream 114 may actually be found in buffer 144, video player 142 may reach the end of the buffered portion and be unable to continue playing a stream 114 using normal or conventional trick-play techniques. Some video players therefore instead utilize a technique whereby a series of time-indexed thumbnail images are displayed during the fast-forwarding or rewind operation. These thumbnails, typically taken at large time intervals (e.g. every ten seconds), are usually downloaded as part of metadata 118, separately from the video data of any stream 114. While video player 142 is fast-forwarding through a given timecode, the thumbnail closest to the timecode is displayed.

In embodiments, video player 142 may provide enhanced trick-play modes instead of utilizing separate thumbnail data. For portions of video content item 112 that have not been completely buffered, buffer 144 may include a number of buffered single frames, such as frames 146, that have been extracted at various intervals from one or more of the streams 114 of the video content item 112 as a result of techniques described elsewhere in this disclosure. These extracted frames are stored in buffer 144 in isolation of the video data with which the frames are surrounded in the one or more streams 114 of the video content item 112. For instance, buffer 144 may store complete video data segments 145 up to a certain timestamp, and then, for a number of subsequent segments, store only a small sampling of the frames 146 that exist for those segments, without ranges of data representing the other frames in between the sampled frames (as illustrated in FIG. 1 by omitted portions 147). The sampled frames may include key frames, and in many embodiments are primarily or exclusively key frames. Depending on the context, the frames may have been sampled at differing levels of granularity (e.g. every key frame, every other key frame, three key frames per second, a key frame every other second, etc.).

Video player 142 utilizes these buffered frames to provide the enhanced trick-play modes. Generally speaking, video player 142 thus selects frames from a sequence of sampled frames—typically key frames—and utilizes the selected frames to provide enhanced playback during a trick-play operation. Video player 142 may employ any of a variety of techniques to control the timing and duration of display for each selected frame in such a manner as to emulate playback at the requested playback rate for the trick-play operation.

For example, video player 142 may not be able to emulate playback at a certain frame rate by simply skipping a calculated number of frames of the video data in the segment, because video player 142 may not be able to find a copy of the next calculated frame to display. However, video player 142 may be able to approximate this behavior by selecting to instead display the closest frame that is actually stored in the buffer 144. Thus, for example, if playback at a certain framerate would normally require display of every $8^{th}$ frame, and buffer 144 only has a copy of frames 9, 15, 24, and 30 (presumably because these are key frames), video player 142 would play these frames instead. Or, if playback at a certain framerate would normally require display of every $16^{th}$ frame, video player 142 might only display frames 9 and 30.

Video player 142 may furthermore be configured to adjust the amount of time each frame is displayed while in the fast forward mode. For example, rather than trying to display thirty frames per second while fast forwarding, video player 142 might display only eight frames per second or fifteen frames per second. In so doing, video player 142 may be capable of appearing to fast forward through a portion of the video content at a high frame rate even when only a small sample of frames are available for that portion. For instance, suppose that the buffer 144 stored only every sixteenth frame, but a 4× playback mode were selected. Video player 142 would need at least every fourth frame if it were to attempt to show thirty frames per second while in the 4× playback mode. By instead showing only 7.5 frames per second, video player 142 can nonetheless emulate a 4× playback mode using only the stored frames.

In an embodiment, instead of offering predefined playback modes such as 2× or 4×, video player 142 may adjust the playback modes to reflect the granularity at which the frames are available in the buffer 144. For example, if on average only every $10^{th}$ frame is stored, instead of offering 8×, 16×, and 32× playback modes, video player 142 may offer 5×, 10×, and 20× playback modes to better match the frequency of the available frames.

Video player 142 may furthermore make adjustments to the playback mode while performing a trick-play operation. For instance, one frame might be displayed for 0.05 seconds, while the next frame might be displayed for 0.04 seconds based on how far apart the frames are. As another example, an 8× playback mode may be adjusted to a 7.5× playback mode, and then to a 10× playback mode on the fly, based on the spacing of the frames available in the buffer 144.

In an embodiment, since the video data stored in the buffer 144 may be assembled from different streams 114, the frames may themselves have been extracted from different streams 114. Accordingly, the frames may have different properties, such as different resolutions or bit rates. Video player 142 is configured to dynamically adjust the manner in which frames are displayed by for example, upscaling or downscaling the frames to different resolutions, so as to give the appearance of a single cohesive stream.

2.7. Streaming Client

Client 140 further includes a streaming client 150. Streaming client 150 "streams" video content items 112 from streaming server 120 by sending requests to proxy server 130 and/or streaming server 120 and receiving, in response, metadata 118 and streams 114, or portions thereof. Streaming client 150 includes logic that manages the streaming of a video content item 112 based on metadata 118, so as to identify what portions of which streams 114 to request at which times. This logic may further take into consideration a variety of factors, such as network latency, network throughput, network jitter, what data already is currently buffered in buffer 144, command input received in association with playback of the video content item 112 by video player 142, user performance preferences, and so forth. Streaming client 150 is furthermore responsible for assembling the data it receives into structures within buffer 144, arranged in such a manner as to permit playback by the video player 142.

Streaming client 150 is coupled to video player 142. Video player 142 may request that streaming client 150 retrieve a certain video content item 112. For example, a user of video player 142 may have entered an address or other identifier of the video content item 112 directly into an interface of the video player 142, or the user may have navigated to the video content item 112 using browser, media library, program guide, or other navigational software executing on client 140. Streaming client 150 begins to stream the video content item 112 by first requesting a manifest comprising various metadata 118, such as information identifying the various streams 114 and indexes 116 available for the video content item 112. The request is made either to a steaming server 120, or a proxy server 130 in embodiments where the streaming server 120 does not provide all of the needed metadata 118 or streams 114. In some embodiments, if needed, streaming client 150 may use information within the manifest to request other metadata 118 that may not be available within the manifest, such as playlist(s) identifying the constituent segments for some or all of the streams 114 of the video content item, and some or all of indexes 116.

Once streaming client 150 has identified the location of a stream 114 for a video content item 112, streaming client 150 may begin requesting the stream 114 from that location. Each request may request only a portion of the stream 114, such as a segment and/or range of bytes to retrieve. The size of each requested portion may vary depending on the embodiment, network constraints, or even observed network metrics. When the streaming client 150 has received the requested portion, the streaming client 150 stores the requested portion within buffer 144 along with local mapping data that indicates to video player 142, by timestamps, frame identifiers, GOP identifiers, etc., what portion(s) of the video content item 112 are represented by the stored data. Streaming client 150 may then continue by using the metadata 118 to identify a next portion of the stream 114, requesting that next portion, and storing that next portion in buffer 144 along with updated mapping data. Barring some interrupting event or condition, this process may continue indefinitely until the entire stream 144 has been received or playback of the video content item 112 has been terminated.

Buffer Management

Video player 142 may begin playing the content that streaming client 150 has stored in buffer 144 at any time. However, in an embodiment, streaming client 150 uses streaming performance monitoring data such as described in other sections to predict how much of video content item 112 should be stored in buffer 144 before beginning playback, so as to ensure uninterrupted and smooth playback (i.e. so that video player 142 avoids exhausting buffer 144 of frames to display before streaming client 150 can add new portions to the buffer 144). Streaming client 150 may therefore signal to video player 142 when, according to its calculations, buffer 144 is storing enough data to begin playback.

Any of a variety of suitable calculations may be utilized to predict when enough data has been buffered to begin normal playback of a video content item, and these calculations may be based on network latency, jitter, bandwidth, or any other suitable performance metric. The techniques described herein are not specific to any particular one of these predictive techniques.

According to an embodiment, streaming client 150 manages the contents of buffer 144 in such a manner as to, when possible, maintain within the buffer 144 at least a certain amount of video content ahead of a current playback position. The certain amount may be an amount of data (e.g. bytes, bits, etc.) or an amount of time (e.g. the equivalent of 10 seconds worth of video data at the current playback speed). Accordingly, streaming client 150 is configured to monitor the current playback position of video player 142. As the position changes, streaming client 150 may request additional portions of video content item 112 to ensure that this certain amount of data is available. In some embodiments, streaming client 150 also maintains within the buffer 144 a certain amount of data behind the current playback position. The term "buffer window" is used herein to refer to portions of the video content item 112 for which continuous video data exists in buffer 144, and that therefore can be played by video player 142 using a normal playback mode.

Of course, streaming client 150 may be unable to always maintain within the buffer window a certain amount of data ahead (or behind) of the current playback position, particularly if the end of the video content item 112 is near, or if the current playback position jumps dramatically (e.g. in response to a skip command or fast-forward command). In the latter case, streaming client 150 may be configured to take a variety of measures to address the problem, such as instructing the video player 142 to pause the stream, or implementing adaptive streaming and/or trick-play optimization described herein, until streaming client 150 has once again had enough time to fill the buffer 144 with the necessary amount of data.

In an embodiment, streaming client 150 is not limited to only filling the buffer 144 with the certain amount of data ahead of the current playback position. For example, once the certain amount of data has been buffered, streaming client 150 may continue to fill the buffer 144 with additional video content ahead and/or behind of the current playback position so as to create a larger buffer window. Streaming client 150 may even buffer an entire stream 114. However, in an embodiment, streaming client 150 may be constrained in the amount of space it can allocate to the buffer 144. Therefore, streaming client 150 may take measures such as deleting some or all content in the buffer that is outside of a certain temporal distance from the current playback position, or throttling (i.e. reducing the frequency of) its requests for content so as to keep the buffer 144 from growing too far ahead of the current playback position.

Adaptive Streaming

In an embodiment, streaming client 150 uses metadata 118 describing properties of the various streams 114 available for the video content item 112 to determine which stream 114 it intends to download. Streaming client 150 may select the stream 114 from which to download content based on a variety of factors, such as a maximum supported resolution for the client 140, user instructions or preferences specifying a desired quality or resolution level, or data usage limits specified by a user. Thus, for example, the streaming client 150 may avoid requesting a stream having a 4K resolution on a device capable only of displaying only a 1080P resolution. Or the streaming client 150 may avoid requesting a stream 114 that it anticipates as having a total size of 1 GB when streaming over a network on which the user has indicated a 100 MB data usage cap is imposed.

Streaming client 150 may also or instead utilize streaming performance metrics to select which stream 114 to display. For example, streaming client 150 may be configured to stream video content item 112 in such a manner as to ensure that playback of video content item 112 will begin in a certain amount of time upon being requested. Based on historical network metrics, streaming client 150 may therefore calculate that a stream of no greater than a certain bitrate should be requested, so as to ensure that enough data will be buffered to begin playback within the certain amount of time.

According to an embodiment, streaming client 150 may switch between requesting content from different streams 114 at different times based at least partially on the performance metrics. For instance, streaming client 150 may begin streaming a video content item 112 by streaming a low bitrate stream 114, but quickly fill up buffer 144 to such an extent that there is more than a certain threshold amount of video content in buffer 144 left for video player 142 to play. Streaming client 150 may thus determine that a higher bitrate stream 114 may be used. Streaming client 150 thus begins filling the buffer with content from the higher bitrate stream 114 rather than the lower bitrate stream 114. Streaming client 150 may even, in some embodiments, optionally replace some of the already-buffered lower bitrate portions with higher bitrate portions. Inversely, if streaming client 150 is unable to continue filling the buffer 144 at an expected rate (e.g. due to degraded performance metrics), streaming client 150 may switch to a lower bitrate stream 114. More generally, a variety of similar "adaptive bitrate" techniques may be utilized. For example, streaming client 150 may be configured to implement HLS or MPEG-DASH streaming client techniques.

The streaming client 150 assembles the video content within the buffer 144, in such a manner that the content appears to be a continuous stream, even though its constituent portions originated from different streams 114. Thus, for instance, the first segment of video data stored within buffer 144 for the video content item 112 may be of a high bitrate, the second (and immediately following) segment of video data stored within buffer 144 for the video content item 112 may be of a lower bitrate, the third segment may again be of a higher bitrate, and so forth. Mapping data within buffer 144 and/or the arrangement of buffer 144 itself may stitch these different bitrate segments together in such a manner that the video player 142 plays them one after another, resulting in smooth playback of the video content item 112, even if some of the segments are at lower bitrates.

Channels

According to an embodiment, streaming client 150 utilizes channels or sessions to stream content. Generally, a channel or session permits the streaming client 150 to submit a single request at a time, and the streaming client 150 must wait to request further content until the streaming client 150 receives a response to the request. In an embodiment, streaming client 150 may instead utilize multiple channels or sessions to simultaneously request and receive contents from different portions of the same stream 114, or even from different streams 114.

2.8. Performance Monitor

According to an embodiment, streaming client 150 comprises or is coupled to a performance monitor 154. Performance monitor 154 generates performance metrics that reflect various measures affecting the streaming performance of the client 140. The performance metrics may include, for instance, network latency, network throughput, network bandwidth, and network jitter (e.g. how latency changes over time). Performance monitor 154 may generate these metrics by measuring, for instance, how much data is being received by the streaming client 150 and how quickly requested data is being returned. Performance monitor 154 may store the metrics in a location accessible to streaming client 150, and update the metrics over time. The frequency of updates may vary depending on the implementation.

In an embodiment, performance monitor 154 may further calculate and store historical metrics (e.g. average or median metrics over a period of time). These metrics may further be specific to the network through which client 140 is accessing content, the time and/or day at which the content is being accessed, the streaming server 120 that hosts the content, and so forth.

In an embodiment, performance monitor 154 may be shared with other components of client 140. For example, an operating system may provide a performance monitor 154 whose data is accessible to streaming client 150. The performance monitor 154 may therefore monitor and calculate metrics based upon other communications instead of or in addition to the streaming operations performed by streaming client 150. In an embodiment, performance monitor 154 may also or instead be configured to send and receive test packets to computer performance metrics. In these manners, current performance metrics may be available to streaming client 150 before streaming client 150 even begins the streaming process.

2.9. Trick-Play Optimizer

According to an embodiment, streaming client 150 further includes or is coupled to a trick-play optimizer component 152. The trick-play optimizer component 152 is software and/or hardware-based logic configured to optimize the data stored in buffer 144 such that video player 142 can perform the enhanced trick-play playback techniques described herein. Trick-play optimizer 152 can instruct or otherwise cause streaming client 150 to issue requests for contents of a video content item 112 at times when streaming client 150 would not normally have requested those contents using conventional streaming algorithms that are not optimized for trick-play operations.

In an embodiment, while video player 142 is executing a trick-play operation, in anticipation of video player 142 reaching the end of the current buffer window for buffer 144, trick-play optimizer 152 is configured to instruct or otherwise cause streaming client 150 to make requests for a sampling of individual frames from portions of the currently playing video content item 112 that are outside of the current buffer window. Trick-play optimizer 152 intentionally omits requesting other video content surrounding the sampled frames within the portions outside of the current buffer window. As the trick-play operation continues, trick-play optimizer 152 continues to add to the sampling of frames, extending the availability of such frames within the buffer 144 further and further into the video content item 112.

For instance, trick-play optimizer 152 may identify key frames within a stream 114 using an index 116 of those key frames. Based on various factors described below, trick-play optimizer 152 may select a sequence of these key frames to request, which may include some or all of the key frames, beginning with the frame that is temporally closest to the buffer window in the direction of the trick-play operation, and then continuing in that direction. Trick-play optimizer 152 may instruct streaming client 150 to make ranged requests (e.g. byte range requests) just for the byte ranges indicated by the index 116 as corresponding to the selected key frames. Streaming client 150 is not, at this time, instructed to request other contents between these key frames, such as delta frames or even other key frames that were not selected. Trick-play optimizer 152 may continue adding to the sequence as the trick-play operation continues, and stop once the trick-play operation concludes.

Frame Selection

The set of key frames selected by trick-play optimizer 152 for download may depend on a variety of factors. For example, if video player 142 is currently fast-forwarding through the buffer 144 at a specific playback speed, or if trick-play optimizer 152 anticipates fast-forwarding at a specific playback speed, trick-play optimizer 152 may select key frames at approximate intervals that would be optimal for that playback speed. Trick-play optimizer 152 might also select frames based on current performance metrics. For instance, if current performance metrics indicate that only a certain number of key frames can be reliably requested within an amount of time the video player 142 will take to fast-forward through a given portion of content, then the number of key frames selected from that portion, and the approximate intervals at which they are selected, may be constrained by this limitation. Of course, the number of frames and frequency of frames may be adjusted over the course of a trick-play operation to reflect changes to the playback speed, current performance metrics, and other factors.

In an embodiment, trick-play optimizer 152 furthermore selects which stream 114 to retrieve the frames from. While in some embodiments, for technical reasons, the frames selected from any given segment or GOP may be required to have been extracted from the same stream 114, trick-play optimizer 152 may otherwise be free to switch between streams 114 using adaptive streaming logic similar to that employed by streaming client 150 for normal playback. Thus, for example, trick-play optimizer 152 may begin to populate buffer 144 for a fast-forward operation under a pessimistic assumption that trick-play optimizer 152 will only be able to fill the buffer 144 with frames quickly enough if frames are extracted from a low-bandwidth stream, and then change its strategy to select frames from a high-bandwidth stream once it is clear that the buffer 144 is in fact being filled quickly enough. Trick-play optimizer 152 may even find, within an index 116, data indicating the exact size of each frame available for individual downloading, and use that knowledge to determine which frames to select.

An additional consideration when selecting streams 114 is the trade-off between the number of frames to display per second during the trick-play operation and the quality of those frames. Trick-play optimizer 152 may include a variety of configuration parameters configured to balance between these two factors, and may even do so based on the type of content being displayed. For example, trick-play optimizer 152 may be configured so as to ensure that a minimum of eight or twelve frames per second are displayed during the trick-play operation, so long as the bitrate is kept over a target amount.

In an embodiment, trick-play optimizer 152 may also select frames based on assumptions about how long the trick-play operation will last. For instance, since some content will typically already exist within the buffer window when a trick-play operation is first requested, trick-play optimizer 152 may initially have more time to pre-fetch individual frames outside of the buffer window before the individual frames will be needed. Trick-play optimizer 152 might therefore initially request a greater number of frames and/or higher quality frames to add to the buffer 144, until the current playback position reaches a certain distance from the last buffered frame. This certain distance, for example, may be a function of the current playback rate, and be chosen such that trick-play optimizer 152 leaves itself enough time (as calculated based on the performance metrics) to fetch a target number of additional frames before playback reaches the last buffered frame. Trick-play optimizer 152 may then shift (potentially gradually) to selecting fewer frames and/or lower quality frames to add to the buffer 144. Trick-play optimizer 152 may be configured around an assumption that most trick-play operations will be minimal in duration, and therefore behave in this manner by default, or trick-play optimizer 152 may only behave in this manner when there is some reason to believe that the trick-play operation will be of a certain duration (e.g. metadata 118 describing commercial breaks or common jump points).

Trick-Play Window

According to an embodiment, trick-play optimizer 152 may attempt to satisfy the needs of a requested trick-play operation by creating and maintaining a "trick-play window." Trick-play optimizer 152 may be configured to create and maintain a trick-play window within the buffer 144 that extends beyond the buffer window in one or both directions. The trick-play window is a period of time in the video content item 112 for which the buffer 144 includes a sampling of individual frames separated by approximately equal time intervals, even if other frames between the sampled frames are not in the buffer 144. By definition, the trick-play window includes the buffer window used for normal playback, which may also be referred to as the "normal" buffer window or "full" buffer window for purposes of differentiation.

Trick-play optimizer 152 creates the trick-play window by identifying frames to request, and causing streaming client 150 to request the frames, as discussed above. As the current playback position changes, trick-play optimizer 152 may continue to add to the trick-play window in order to attempt to maintain the trick-play window at a target size. Depending on the embodiment, the target size of the trick-play window may be predefined, vary depending on factors such as the playback rate of the trick-play operation or an anticipated trick-play operation duration, or grow as resources may permit.

Look-Ahead Trick-Play Optimization

In an embodiment, trick-play optimizer 152 is configured to instruct or otherwise cause streaming client 150 to request frames outside of the current buffer window, even when video player 142 is not currently engaged in a trick-play operation. For example, trick-play optimizer 152 may also create a trick-play window in anticipation of a trick-play operation, or continually, as resources may permit. The target size of the trick-play window may be determined as explained above, or vary depending on an anticipated playback rate or duration for an anticipated trick-play operation.

For example, using metadata 118, trick-play optimizer 152 may determine that the current playback position is within a certain distance of a common jump point, and that the user is thus likely to soon fast-forward through content. The trick-play optimizer 152 may therefore begin building a trick-play window of a certain size by selecting a sequence of frames outside of the normal buffer window to request, and instructing the streaming client 150 to download those frames. The trick-play optimizer 152 may stop building this trick-play window once it reaches a certain size. Note, however, that as the normal buffer window moves due to normal operation of streaming client 150, the difference between the size of the buffer window and the size of the trick-play window shrinks, and trick-play optimizer 152 may therefore attempt to increase it accordingly. In the event that creation of the trick-play window is triggered by detecting a common jump point for starting a trick-play operation, trick-play optimizer 152 may limit the size of the trick-play window to a position that approximately corresponds to an associated jump point at which playback is normally resumed (e.g. at the end of a commercial break or at the beginning of a next play in a sports broadcast).

As another example, trick-play optimizer 152 may be configured to maintain a trick-play window in perpetuity, as resources permit, regardless of whether a trick-play operation is actually anticipated.

Multiple Trick-Play Windows

According to an embodiment, trick-play optimizer 152 may create multiple, overlapping trick-play windows or different size, having frames selected at different intervals and/or from different streams 114. Each window may be optimized for a different purpose.

For example, the trick-play optimizer may maintain a first trick-play window that, for instance, is optimized for a 2× playback operation and extends out approximately fifteen seconds from the normal buffer window. The buffered frames may include, for example, every key frame within the first trick-play window, but not any other frames outside of the normal buffer window. The trick-play optimizer 152 may have determined that this amount of buffering is sufficient to support any 2× playback operation.

Meanwhile, the trick-play optimizer 152 may also maintain a second trick-play window optimized for, for instance, a 4× playback operation. The second trick-play window may, for instance, extend out approximately thirty seconds from the normal buffer window (i.e. the size of the first window plus another fifteen seconds), which the trick-play optimizer 152 may have determined is needed to support a 4× playback operation. The buffered frames may include, for instance, every other key frame within the timespan covered by second trick-play window, but not any other frames outside of those already found in the normal buffer window and the first trick-play window. Or, the buffered frames may include, for example, every key frame within the second trick-play window, but the key frames that are exclusively within the second trick-play window may have been extracted from a lower bitrate stream than those that are also in the first trick-play window.

Any number of trick-play windows may be created or maintained. For example, and without limitation, trick-play optimizer 152 may also be configured to generate trick-play windows optimized for 8×, 16×, and 32× playback modes. Moreover, trick-play optimizer 152 may be configured to create, at the same time, one or more trick-play windows as part of a continuously running background operation, and one or more trick-play windows in response to or in anticipation of a trick-play operation. For instance, trick-play optimizer 152 may continually maintain a lower quality trick-play window optimized for a 30× playback mode, but also generate a higher quality trick-play window for a 4× playback mode in anticipation of an upcoming jump point. If the video player 142 exhausts the high quality trick-play window (e.g. if the high quality window was designed only to cover the commercial break, and the video player 142 continues to fast-forward beyond the break), then the low quality window could continue to supply frames for the operation.

As a first trick-play window grows, the trick-play optimizer 152 may, in certain cases, take advantage of a second overlapping trick-play window to reduce the number of requests needed to fill the first trick-play window. For example, rather than requesting each frame needed in the first trick-play window anew, trick-play optimizer 152 may only request frames that have not already been downloaded for the second trick-play window. In an embodiment, however, if the first trick-play window and the second trick-play window are made up of frames from different streams 114, the trick-play optimizer 152 may prefer to replace frames from the second trick-play window that were extracted from a lower quality stream 114.

Using Trick-Play Window to Optimize the Normal Buffer Window

According to an embodiment, streaming client 150 may utilize a trick-play window to optimize its maintenance of the normal buffer window for normal playback. For example, if, as streaming client 150 expands the normal buffer window, streaming client 150 finds frames from an already-existing trick-play window within the buffer 144, and if those frames were extracted from an acceptable stream 114, streaming client 150 may issue ranged requests for only the frames that are not already found in the buffer 144. This may mean that, for instance, if the trick-play window already includes a set of key frames for a segment that streaming client 150 intends to buffer, streaming client 150 need only request the delta frames and any missing key frames for that segment.

In an embodiment, streaming client 150 may utilize jump point information in metadata 118 to inform its selection of which portions of the video content item 112 to maintain in the full buffer window. For example, in the middle of a fast-forward operation, streaming client 150 may use metadata 118 to identify a terminal jump point at which normal playback of the video content item normally resumes or is predicted to resume. Instead of attempting to create a full buffer window around the current playback position, which is a quickly moving target on account of the trick-play operation, streaming client 150 may attempt to resume the normal buffer window at or near the terminal jump point.

As another example, during normal playback mode, streaming client 150 may determine that the normal buffer window is not to include a portion of video content item 112 between two jump points (e.g. a starting jump point and a terminal jump point), but that the portion is instead to be covered by a trick-play window. Streaming client 150 may thus skip requesting full content once the normal buffer window has reached the starting jump point, and resume building the normal buffer window at the terminal jump point.

In an embodiment, streaming client 150 may furthermore optimize the manner by which it removes content from the buffer 144 to take in consideration possible rewind operations. Hence, for example, when it comes time to delete a segment that has already been played (e.g. on account of a determination that the segment is now "stale"), streaming client 150 may begin by only deleting some of the frames (e.g. delta frames, every other frame, etc.), thus leaving behind a set of frames for the segment within the buffer. If the video player 142 were to subsequently rewind over the segment, the set of frames would thus be available to provide an enhanced trick-play playback. Of course, this set of frames may eventually be deleted as well, and various logic may be utilized to determine when to delete the remaining frames. Moreover, the remaining frames may be deleted in various stages. For example, in each stage, streaming client 150 may determine to delete only every other remaining frame.

Trick-Play Window Prioritization

According to an embodiment, trick-play optimization requests by streaming client 150 must be carefully balanced with the need to maintain a continuous normal buffer window of at least a certain size to support normal playback. Various prioritization schemes may be utilized to balance these needs. For example, streaming client 150 may simply prioritize requests for contents to fill the normal buffer window when the size of the normal buffer window is below some threshold (e.g. a function of the streaming performance metrics), prioritize requests to fill a trick-play window when the normal buffer window is above the threshold size but the trick-play window size is less than another threshold (e.g. a function of streaming performance metrics and an operation for which the trick-play window is optimized), and then prioritize requests equally thereafter. As another example, streaming client 150 may balance requests so as to maintain the size of the trick-play window at a certain ratio to the size of the normal buffer window. As yet another example, streaming client 150 may prioritize requests to populate the trick-play window during trick-play operations and/or in anticipation of trick-play operations, but not at other times.

In an embodiment, multiple channels may be used to request content for both purposes simultaneously, with some channel(s) requesting content for the trick-play window and other(s) requesting content for the normal buffer window. A channel may be dedicated to either the trick-play buffer or normal buffer, or the channel may be used for either purpose indiscriminately. In the former case, the channels may be throttled at times to prioritize a certain buffer.

In an embodiment, various queueing mechanisms may be utilized to determine when to send requests. Any combination of the foregoing factors may be used to determine how frequently to request content for the normal buffer window versus a trick-play window. For example, during normal playback, under normal streaming performance conditions, for every ten normal buffer requests, there may a single trick-play buffer request. However, during more optimal performance conditions, or during a trick-play operation, there may be one trick-play request for every normal buffer request. Of course, the permutations of such configurations are endless.

In an embodiment, streaming client 150 may, at any given time allocate a certain amount of resources (e.g. number of requests, bandwidth, etc.) to trick-play requests. This amount may change based on the current operating mode of video player 142, the size of the normal buffer window, streaming performance metrics, and so forth. Streaming client 150 may advise trick-play optimizer 152 of this amount, and trick-play optimizer may determine which frames to extract from which streams 114 based on the available resources.

In embodiments with multiple trick-play windows, requests may furthermore be prioritized by streaming client 150 and/or trick-play optimizer 152 based on the purpose of the trick-play window for which the content is being requested. The exact prioritization scheme may vary based on the current playback mode and/or an anticipated upcoming playback mode. For example, under normal playback conditions, trick-play optimizer 152 may attempt to build a low-quality trick-play window before building a higher quality trick-play window. Or trick-play optimizer 152 may attempt to build a 16× playback rate window to a certain size before building an 8× playback rate window. This prioritization scheme might reverse, however, if video player 142 enters an 8× playback rate mode. In an embodiment, trick-play optimizer 152 may attempt to keep the trick-play window sizes at a specific ratio relative to each other. In another embodiment, trick-play optimizer may just fetch the first frame from each segment (e.g. if there is no index).

2.10. Miscellaneous

System 100 illustrates only one of many possible arrangements of components configured to provide the functionality described herein. Other arrangements may include fewer, additional, or different components, and the division of work between the components may vary depending on the arrangement. For example, in some embodiments, proxy server 130 may be omitted, along with any other components relied upon exclusively by the omitted component(s). As another example, in an embodiment, streaming client 150, trick-play optimizer 152, and video player 142 may be integrated together into a single software application and/or implemented in a user equipment device.

User equipment device may receive media content and data via input/output (hereinafter "I/O") path. The I/O path may provide media content (e.g., broadcast programming, on-demand programming, Internet content, and other video or audio) and data to control circuitry, which includes processing circuitry and storage/memory. Control circuitry may be used to send and receive commands, requests, and other suitable data using the I/O path. The I/O path may connect control circuitry (and specifically processing circuitry) to one or more communications paths (described below).

Control circuitry may be based on any suitable processing circuitry such as processing circuitry based on one or more microprocessors, microcontrollers, digital signal processors, programmable logic devices, etc. In some embodiments, control circuitry executes instructions for a media guidance application stored in memory (i.e., storage 308). In client-server based embodiments, control circuitry may include communications circuitry suitable for communicating with a guidance application server or other networks or servers. Communications circuitry may include a cable modem, an integrated services digital network (ISDN) modem, a digital subscriber line (DSL) modem, a telephone modem, or a wireless modem for communications with other equipment. In addition, communications circuitry may include circuitry that enables peer-to-peer communication of user equipment devices, or communication of user equipment devices in locations remote from each other (described in more detail below).

Memory (e.g., random-access memory, read-only memory, or any other suitable memory), hard drives, optical drives, or any other suitable fixed or removable storage devices (e.g., DVD recorder, CD recorder, video cassette recorder, or other suitable recording device) may be provided as storage that is part of the control circuitry. The memory/storage may include one or more of the above types of storage devices. For example, the user equipment device may include a hard drive for a DVR (sometimes called a personal video recorder, or PVR) and a DVD recorder as a secondary storage device. The storage may be used to store various types of media described herein and guidance application data, including program information, guidance application settings, user preferences or profile information, or other data used in operating the guidance application. Non-volatile memory may also be used (e.g., to launch a boot-up routine and other instructions).

Control circuitry may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry may also include scaler circuitry for upconverting and downconverting media into the preferred output format of the user equipment. Circuitry may also include digital-to-analog converter circuitry and analog-to-digital converter circuitry for converting between digital and analog signals. The tuning and encoding circuitry may be used by the user equipment to receive and to display, to play, or to record media content. The tuning and encoding circuitry may also be used to receive guidance data. The circuitry described herein, including for example, the tuning, video generating, encoding, decoding, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment, the tuning and encoding circuitry (including multiple tuners) may be associated with storage 308.

A user may control the control circuitry using user input interface. User input interface may be any suitable user interface, such as a remote control, mouse, trackball, keypad, keyboard, touch screen, touch pad, stylus input, joystick, voice recognition interface, or other user input interfaces. Display may be provided as a stand-alone device or integrated with other elements of user equipment device. The display may be one or more of a monitor, a television, a liquid crystal display (LCD) for a mobile device, or any other suitable equipment for displaying visual images. In some embodiments, the display may be HDTV-capable. Speakers may be provided as integrated with other elements of user equipment device or may be stand-alone units. The audio component of videos and other media content displayed on display 312 may be played through the speakers. In some embodiments, the audio may be distributed to a receiver (not shown), which processes and outputs the audio via the speakers.

In some embodiments, system 100 may include streaming servers 120 operated by different streaming service providers or other entities, and these entities may have different video repositories 110 to which they provide access via their respective streaming servers 120. In an embodiment, a different proxy server 130 exists for each different streaming service provider. In another embodiment, a single proxy server 130 may support multiple different streaming servers 120 operated by different entities. Naturally, some addressing mechanism in the requests sent to proxy server 130 would differentiate between the streaming server 120 that is to ultimately provide the requested video content.

3.0. Functional Overview 3.1. General Flow

Figure 2:
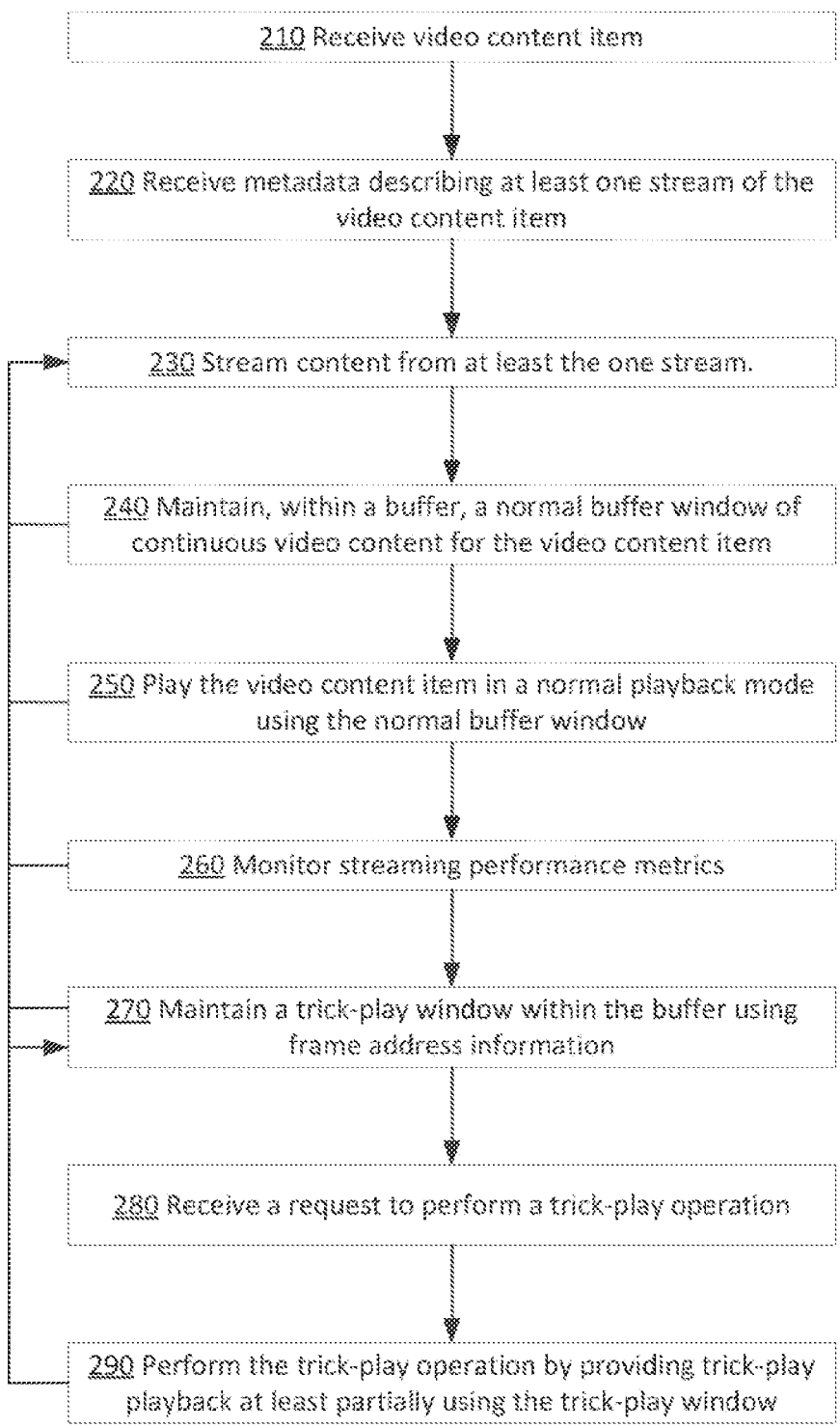
FIG. 2 illustrates an example flow for providing an enhanced trick-play mode.

FIG. 2 illustrates an example flow 200 for providing an enhanced trick-play mode, according to an embodiment. The various elements of flow 200 may be performed in a variety of systems, including systems such as system 100 described above. In an embodiment, each of the processes described in connection with the functional blocks described below may be implemented using one or more computer programs, other software elements, and/or digital logic in any of a general-purpose computer or a special-purpose computer, while performing data retrieval, transformation, and storage operations that involve interacting with and transforming the physical state of memory of the computer.

Block 210 comprises a client, such as client 140, requesting an item of video content, such as video content 112, from a server, such as streaming server 120 or proxy server 130, over a network such as the Internet. The request may be, for example, addressed to a Uniform Resource Locator (URL) on the server that corresponds to the video content item. In an embodiment, the request may be for a manifest, such as a master playlist, of the video content item.

Block 220 comprises the client receiving, responsive to the request, metadata, such as metadata 118, describing at least one stream of the video content item. The metadata may indicate, for instance, location information for the stream, and/or individual segments thereof, such URL(s) or other address(es). If multiple streams are available, the metadata may list location information for each stream, as well as data indicating the bitrate and/or other properties of each stream. The metadata may be received directly in response to the request of block 210, and/or the client may use data from the initial response to the request of block 210 to determine how to request various other items of metadata. For example, a manifest for the video content item may include links to a variety of other metadata sources, such as playlists for the streams, indexes, and so forth.

The metadata further includes, among other elements, frame address information specifying locations of specific video frames within each stream. For instance, the metadata may include an index of frames to download to support a trick-play mode, such as a key frame index or other index 116. For each frame, the frame address information may include, for instance, a range of bytes in the stream that correspond to the frame. In an embodiment, the frame address information is stored in or with each stream. In an embodiment, the frame address information is generated and stored, based on the stream, at a proxy server, from which the client downloads it.

Block 230 comprises the client streaming content from at least the one stream. The client streams the content by requesting and receiving successive portions of the video content item from the server at location(s) indicated by the metadata received in block 220. The exact sizes of the portions requested will depend on network conditions, client configuration, and server configuration. Any suitable streaming protocol may be utilized, including, without limitation, HLS and MPEG-DASH. In embodiments with multiple streams, the client may request different portions from different streams, dynamically adapting to changing network conditions.

Block 240 comprises, based on the streaming of the video content from at least the one stream, maintaining, within a buffer, a normal buffer window of continuous video content for the video content item. The buffer may be any suitable structure or collection of structures within one or more memories, such as buffer 144. As the content is streamed in block 230, the client may store the content in the buffer. The different portions are stitched together, by their arrangement within the structures and/or mapping data, such that a video player can play the content as a continuous content stream, even if different portions were streamed from different streams.

The maintaining step is performed concurrently with the streaming step, and both steps continue to be performed over time, such that the buffer extends the window to cover content that is progressively further and further from the start of the stream. For example, maintaining the normal buffer window may comprise iteratively identifying a next range of video data for the video content item that is not stored in the buffer, and requesting the next range from a suitable stream for the video content item.

Block 250 comprises the client playing the video content item in a normal playback mode using the normal buffer window. The normal playback mode comprises playing, in succession, each frame of a continuous section of the video content in the buffer, in the order found within the buffer, and for a duration of time indicted by the predefined framerate of the content.

Again, this step may be performed at the same time as blocks 230 and 240, and even impact when portions of content are streamed from the server. A boundary of the continuous video content is maintained ahead of a moving playback position while in the normal playback mode. In an embodiment, to reduce memory requirements for the buffer, a client may pause streaming content if the window extends too far beyond the current playback position. In an embodiment, the client deletes content at the other end of the buffer window as the client plays the content from the buffer. For example, any content that precedes the current playback position of the content by a certain amount may be deleted. In this manner, the normal buffer window can be considered a continuous set of content that surrounds and moves with the current playback position of the content.

Block 260 comprises the client monitoring streaming performance metrics, based on the streaming. The client may, for example, comprise a performance monitor such as performance monitor 154, that monitors metrics such as network latency, throughput, and jitter. The metrics may be used for a variety of purposes, including, for example, determining how large of a normal buffer window to create, determining when to switch a higher or lower bitrate stream, if available, and determining when to begin playback during the streaming.

Block 270 comprises, based at least on the frame address information, the client maintaining a trick-play window within the buffer. The trick-play window is a set of video frames whose corresponding timestamps relative to the video content item extend a period of time beyond those of the normal buffer window. The trick-play window is a source from which the client can play frames while performing a trick-play operation even if the full video content through which the client is fast-forwarding has not yet been downloaded from the server. The trick-play window buffers, for example, for a portion of the video content item outside of the normal buffer window, only a subset of video frames selected from available video frames in that portion. The client determines the frames to include in the trick-play window using any of the variety of techniques described herein, and uses the frame address information to determine where to request the frames from. For example, the client may issue ranged HTTP GET requests for ranges of bytes, within a stream, that the frame address information indicates is occupied by the frame.

According to an embodiment, maintaining the trick-play window comprises iteratively identifying, in a sequence of video frames to be played during the trick-play playback mode, a next video frame that is not stored in the buffer, and requesting the next video frame from the stream. The selected video frames may be, for instance, individual frames spaced at approximately equal time intervals relative to the video content item. The trick-play window buffers the selected video frames without buffering ranges of the available video frames that are in intervals between the selected video frames. In an embodiment, the selected video frames are key frames whose locations are specified by the frame address information.

In an embodiment, the selected video frames include video frames extracted from different streams. Maintaining the trick-play window further involves determining from which stream, of a plurality of streams described by the metadata for the video content item, to request particular frames of the selected frames in the trick-play window. This determination may be based on, for example, the bitrates of the streams or even the number of bits in a particular frame, and the performance metrics.

In an embodiment, the client may determine how many video frames to select for a given portion of the trick-play window based at least on the performance metrics and the current playback position. Or, the client may determine an approximate time interval, relative to timestamps of the available video frames, between each video frame to select for the portion of the trick-play window based at least on the performance metrics. The client may then select which video frames from a given portion to buffer based on the approximate time interval.

According to an embodiment, the client may select which video frames from a given portion of the video content item to buffer based on a playback rate of a trick-play operation that has been requested, or on an anticipated playback rate of the trick-play operation. Thus, for instance, if a user requests a 16× playback rate, the client may add fewer frames for a given period of time of the stream than for a 2× playback rate, since the client is fast-forwarding through the period of time more quickly. An anticipated playback rate may be predicted based on, for example, information in jump points, historical playback rates used by a viewer at the client, historical rates used by other viewers of the video content item, and so forth.

According to an embodiment, a trick-play window may be created responsive to input requesting a trick-play operation. In another embodiment, creating the trick-play window is responsive to calculating that, based on a playback rate of the trick-play operation and current streaming performance metrics, the current playback position will move outside of the normal buffer window during the trick-play operation. In another embodiment, creating the trick-play window is responsive to determining that a jump point indicated by the metadata is within a threshold temporal distance from the current playback position. In yet another embodiment, the client creates the trick-play window whenever excess bandwidth permits.

According to an embodiment, maintaining the trick-play window may be performed as part of a step of maintaining multiple trick-play windows of different sizes. Each trick-play window is optimized for a different playback rate and/or has a different frame quality. The trick-play windows overlap. For example, the client may attempt to maintain a trick-play window that will provide 16× playback for a certain period of time, and simultaneously attempt to maintain a trick-play window that will provide 4× playback for a shorter period of time. The exact types of trick-play windows maintained will depend on the embodiment and on the available network bandwidth and latency. Different trick-play windows may be generated in response to different triggers. For example, one trick-play window may be maintained constantly as a background process, another might be created when a particular trick-play operation is requested (i.e. to support the playback rate of the requested trick-play operation), and yet another might be created in response to detecting a nearby jump point.

Block 280 comprises receiving a request to perform a trick-play operation, such as a fast-forward or rewind operation. The trick-play operation may further indicate a playback rate, either explicitly or implicitly, such as twice the normal playback rate, four times the normal playback rate, and so forth.

Block 290 comprises performing the trick-play operation by providing trick-play playback at least partially using the trick-play window. During the trick-play operation, the current playback position may move through a portion of the video content item that is outside of the normal buffer window. At such time, the client continues to play the video content item in the trick-play playback mode by displaying video frames only from the buffered subset of frames in the trick-play window, without waiting for the normal buffer window to catch up with the current playback position. Depending on the playback rate and the interval between each frame, the client may play all of the frames that have been buffered for the portion within the trick-play window, or only some of the buffered frames. Moreover, the duration for which the client displays each buffered frame may vary based on the playback rate and on the number of buffered frames available.

In general, the amount of time that the client takes to play through a given portion in the enhanced trick-play mode will correspond to the playback rate, such that for a 16× playback rate, the client will play the portion approximately 16 times faster than it normally would, had each frame of the portion actually been available to play. The client will typically play as many of the buffered frames as it can during that time, adjusting the display duration of each frame as needed to keep the rate at which the client plays through the overall timeline of the video content item substantially at the playback rate.

Flow 200 illustrates only one of many possible flows for providing an enhanced trick-play playback mode for streaming video. Other flows may include fewer, additional, or different elements, in varying arrangements. For example, in some embodiments, block 260 may be omitted, or blocks 280 and 290 may never actually occur. As another example, in an embodiment, a flow may further include ending the trick-play operation once a certain playback position has been reached, or in response to user input. The client then builds a new normal buffer window at the current playback position, if needed, and resumes normal playback at the current playback position once enough content has been buffered.

As another example, a flow may comprise expanding the normal buffer window by re-using one or more frames in the trick-play window rather than streaming the one or more frames again. The expanding includes requesting intervening frames, between the one or more buffered frames, that were not buffered in the trick-play window.

As yet another example, a flow may comprise creating the trick-play window responsive to determining that a first jump point indicated by the metadata is within a threshold temporal distance from the current playback position. The client may thus deliberately limit the trick-play window in size to the end of a second jump point indicated by the metadata, such as an end point associated with the first jump point. The client re-establishes the normal buffer window at the second jump point, potentially in advance of reaching the second jump point (or even the first jump point), without the normal buffer window including at least a portion of content leading up to the second jump point.

3.2. Alternative Flow

Figure 3:
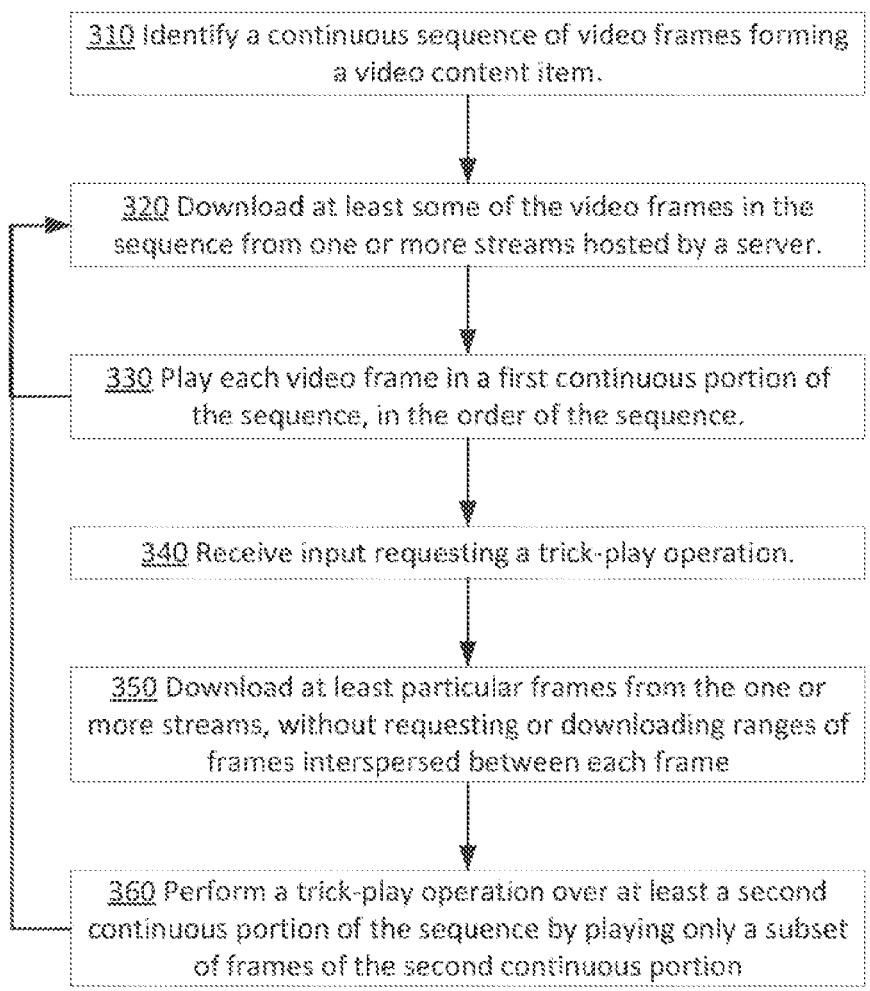
FIG. 3 illustrates another example flow for providing an enhanced trick-play mode.

FIG. 3 illustrates another example flow 300 for providing an enhanced trick-play mode, according to an embodiment. Flow 300 may be utilized in conjunction with flow 200 (e.g. providing an alternative perspective on the elements of flow 200), or entirely separately from flow 300, depending on the embodiment. Of course, flow 200 is merely illustrative. Yet other alternative flows for providing enhanced trick-play modes are also possible using techniques described herein.

Again, the various elements of flow 300 may be performed in a variety of systems, including systems such as system 100 described above. In an embodiment, each of the processes described in connection with the functional blocks described below may be implemented using one or more computer programs, other software elements, and/or digital logic in any of a general-purpose computer or a special-purpose computer, while performing data retrieval, transformation, and storage operations that involve interacting with and transforming the physical state of memory of the computer.

Block 310 comprises a client identifying a continuous sequence of video frames forming a video content item. The frames may be identified, for instance, using metadata describing one or more streams that contain various representations of the video content item. The client need not know particular details about each frame, but rather simply understands that there are a number of frames that have been arranged in a specific sequence to form the video content item, and that each frame corresponds to a different discrete time point within a timeline intended for playing the video content item in a normal playback mode.

Block 320 comprises a client, such as client 140, downloading at least some of the video frames in the sequence from one or more streams hosted by a server, such as streaming server 120 or proxy server 130, using techniques such as described elsewhere in this disclosure. Certain frames may be downloaded as part of ranges of content having many frames, while other frames may be downloaded individually. The frames are downloaded into a buffer and assembled in an order reflecting timestamps of the video content item with which they correspond. Block 320 further comprises determining when to request particular frames to add to the buffer, based on any of the variety of considerations described herein.

In an embodiment, the buffer comprises video frames downloaded from different streams. Block 320 may therefore comprise selecting from which stream, of a plurality of available streams for the video content item, to request particular video frames. In an embodiment, since each stream is a differently formatted version of the video content item, block 320 may comprise determining which version of each frame to download. The stream may be selected, for example, based on current playback needs and streaming performance metrics.

Block 330 comprises playing each video frame in a first continuous portion of the sequence, in the order of the sequence. The frames are played from a buffer in which the first continuous portion is stored. The continuous portion may be delimited, for example, by a first frame at which a viewer instructs the client to begin normal playback of the video content item, and a second frame at which the viewer instructs the client to cease normal playback of the video content item (e.g. in response to block 340). Block 330 (as with the other blocks in flow 300) is performed at least partially concurrently with the ongoing download of the frames into the buffer per block 320.

Block 340 comprises receiving input requesting a trick-play operation. The input may request a direction for the operation (forward or reverse), a playback rate for the operation (e.g. a multiple of the normal playback rate in block 330), and/or a type of operation (e.g. continuous playback at the faster speed, skipping, quick-play, etc.).

Block 350 comprises downloading at least particular frames from the one or more streams, without requesting or downloading ranges of frames interspersed between each frame. Block 350 may comprise, for instance, requesting key frames without requesting delta frames between the key frames, or requesting every tenth frame, or requesting frames in accordance with any other trick-play optimization techniques described herein. In some embodiments, block 350 may actually be performed as part of block 320. Block 350 may be performed responsive to the input of block 340, or prior to block 340.

Block 360 comprises performing a trick-play operation over at least a second continuous portion of the sequence by playing only a subset of frames of the second continuous portion, without playing ranges of frames interspersed between each frame in the subset of frames. The subset of frames, which includes the particular frames downloaded in block 350, are found in the buffer, whereas the ranges of frames are missing in the buffer. In an embodiment, each frame of the subset of frames is separated by at least one of the missing ranges within the sequence. In an embodiment, an equal or approximately equal interval of frames separates each frame of the subset of frames within the sequence.

3.3. Trick-Play Buffer Progression

Figure 4:
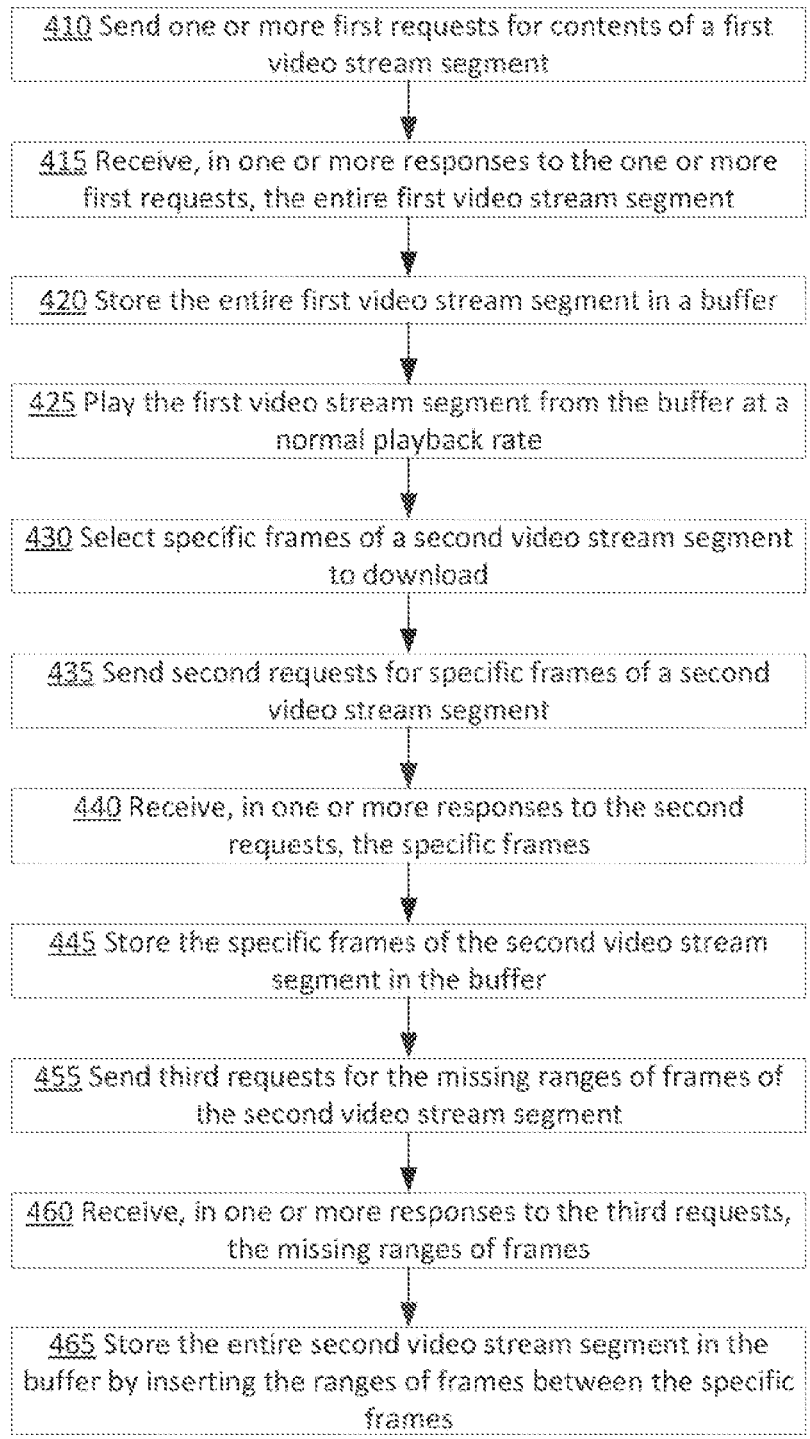
FIG. 4 illustrates an example flow for managing a buffer optimized for trick-play operations.

FIG. 4 illustrates an example flow 400 for managing a buffer optimized for trick-play operations, according to an embodiment. Flow 400 may be utilized in conjunction with flows 200 and 300 (e.g. providing an alternative perspective on the elements of flows 200 and 300), or entirely separately from flow 200 or 300, depending on the embodiment. Of course, flow 300 is merely illustrative. Yet other alternative flows for providing enhanced trick-play modes are also possible using techniques described herein.

Again, the various elements of flow 400 may be performed in a variety of systems, including systems such as system 100 described above. In an embodiment, each of the processes described in connection with the functional blocks described below may be implemented using one or more computer programs, other software elements, and/or digital logic in any of a general-purpose computer or a special-purpose computer, while performing data retrieval, transformation, and storage operations that involve interacting with and transforming the physical state of memory of the computer.

Block 410 comprises a client sending, to a server, such as a proxy server or streaming server, one or more first requests for contents of a first video stream segment. Block 415 comprises the client receiving, in one or more responses to the one or more first requests, the entire first video stream segment, comprising a plurality of frames. Block 420 comprises the client storing the entire first video stream segment in a buffer. Block 425 comprises the client playing the first video stream segment from the buffer at a normal playback rate.

Block 430 comprises the client selecting specific frames of a second video stream segment to download. The second video stream segment may be, for example, a segment that immediately follows the first video stream segment in the same stream as the first video stream segment. Or, the second video stream segment may be in a different stream than the first video stream segment, such as a stream representing the same video content item but having a different bitrate. The two video stream segments may correspond to, for example, different, but adjacent time spans of a video content item. The client may select the specific frames in a manner optimized for performing, or preparing to perform, a trick-play operation as described in other sections. The specific frames may be selected based on, for example, streaming performance metrics and/or a target amount of trick-play buffer time calculated as necessary to sustain smooth playback of the video content item in a trick-play playback mode. For instance, the specific frames may be key frames.

Block 435 comprises the client sending, to a server, which may be the same server or a different server than the server of block 410, second requests for the specific frames of the second video stream segment. In an embodiment, each second request requests a single individual frame. The specific frames are separated by ranges of frames, which are not requested. For example, if the specific frames are key frames, the ranges of frames may be completely or predominately delta frames disposed between the specific frames.

Block 440 comprises the client receiving, in one or more responses to the second requests, the specific frames. Block 445 comprises storing the specific frames of the second video stream segment in the buffer, without the ranges of frames. While the ranges of frames are not found in the buffer, the specific frames may be used to play at least a portion of the second video stream segment at a faster-than-normal playback rate, as described in other sections, in response to, for example, input requesting a trick-play operation.

Block 455 comprises sending, to the server of block 435, third requests for the missing ranges of frames of the second video stream segment, without requesting the specific frames already in the buffer. Block 455 is performed subsequent to storing the specific frames of the second video stream segment in the buffer. For example, block 455 may be performed responsive to the current playback position of the client progressing closer to the second segment.

Block 460 comprises receiving, in one or more responses to the third requests, the ranges of frames. Block 465 comprises storing the entire second video stream segment in the buffer by inserting the ranges of frames between the specific frames, thus allowing the client to continue normal playback through the second video stream segment.

4.0. Implementation Examples
4.1. Illustrative Buffer Examples

Figure 5:
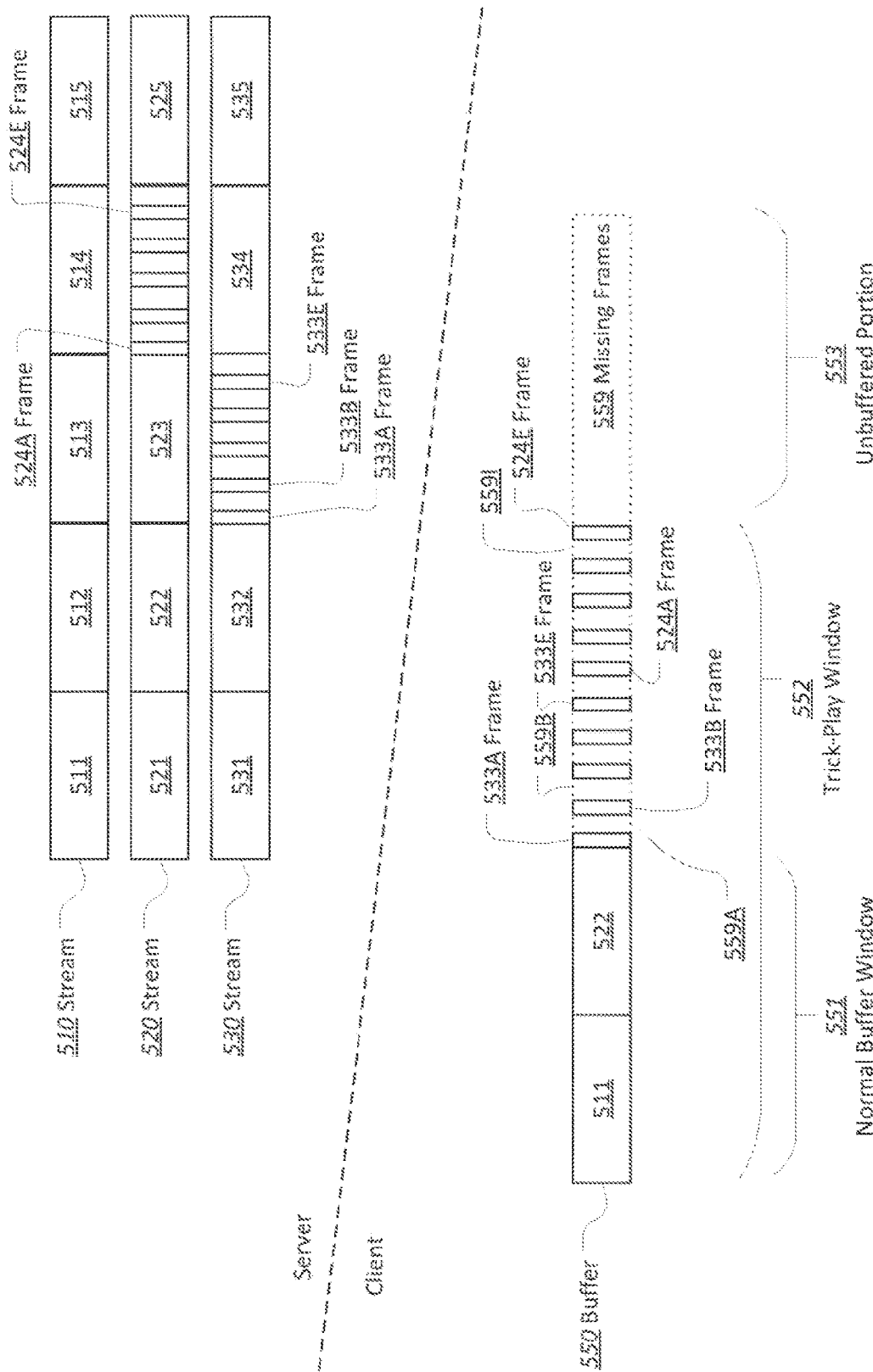
FIG. 5 illustrates an example configuration of a streaming client buffer during operation of streaming client.
Figure 6:
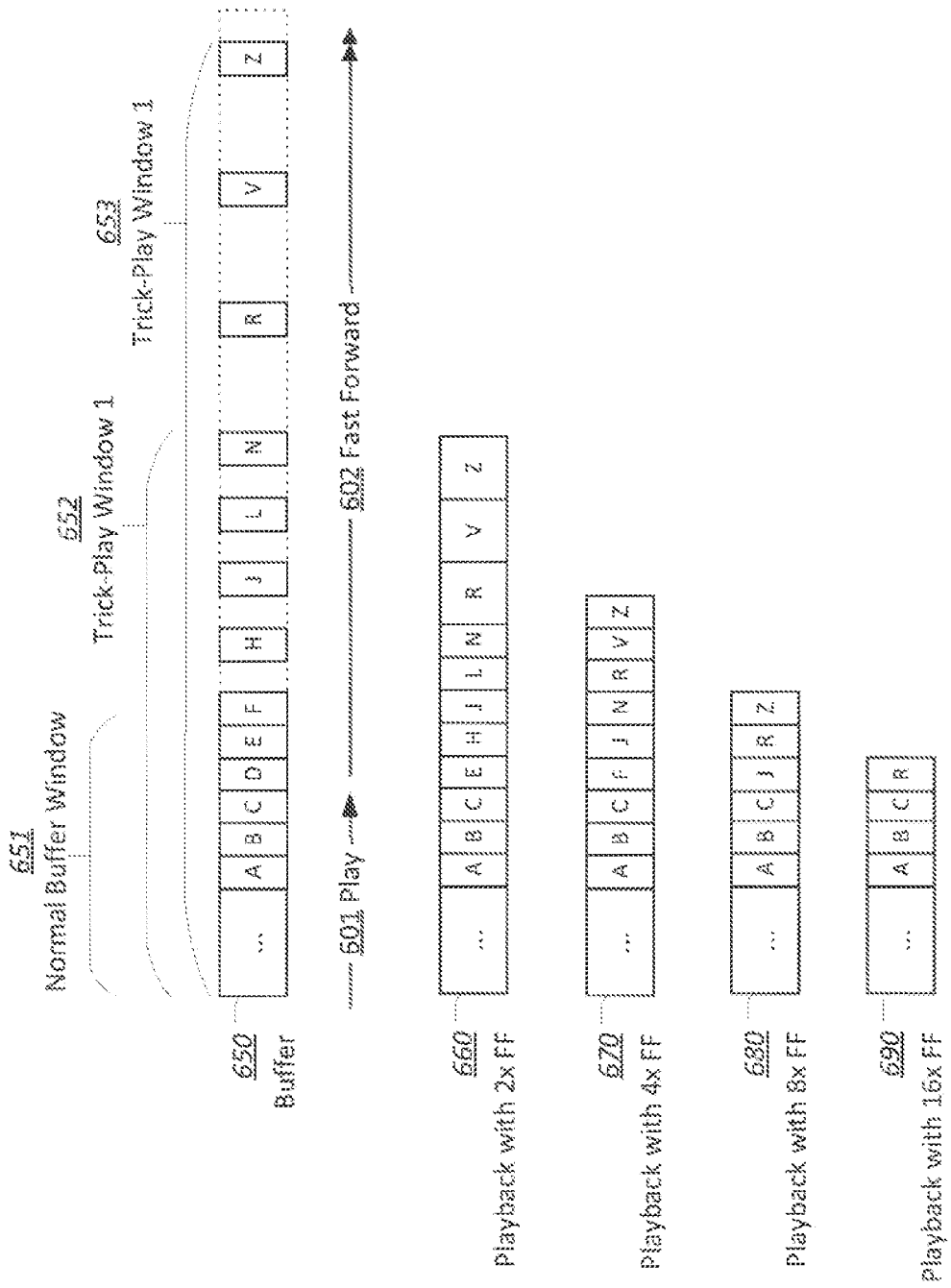
FIG. 6 illustrates another example configuration of a streaming client buffer during operation of a streaming client.
Figure 7:
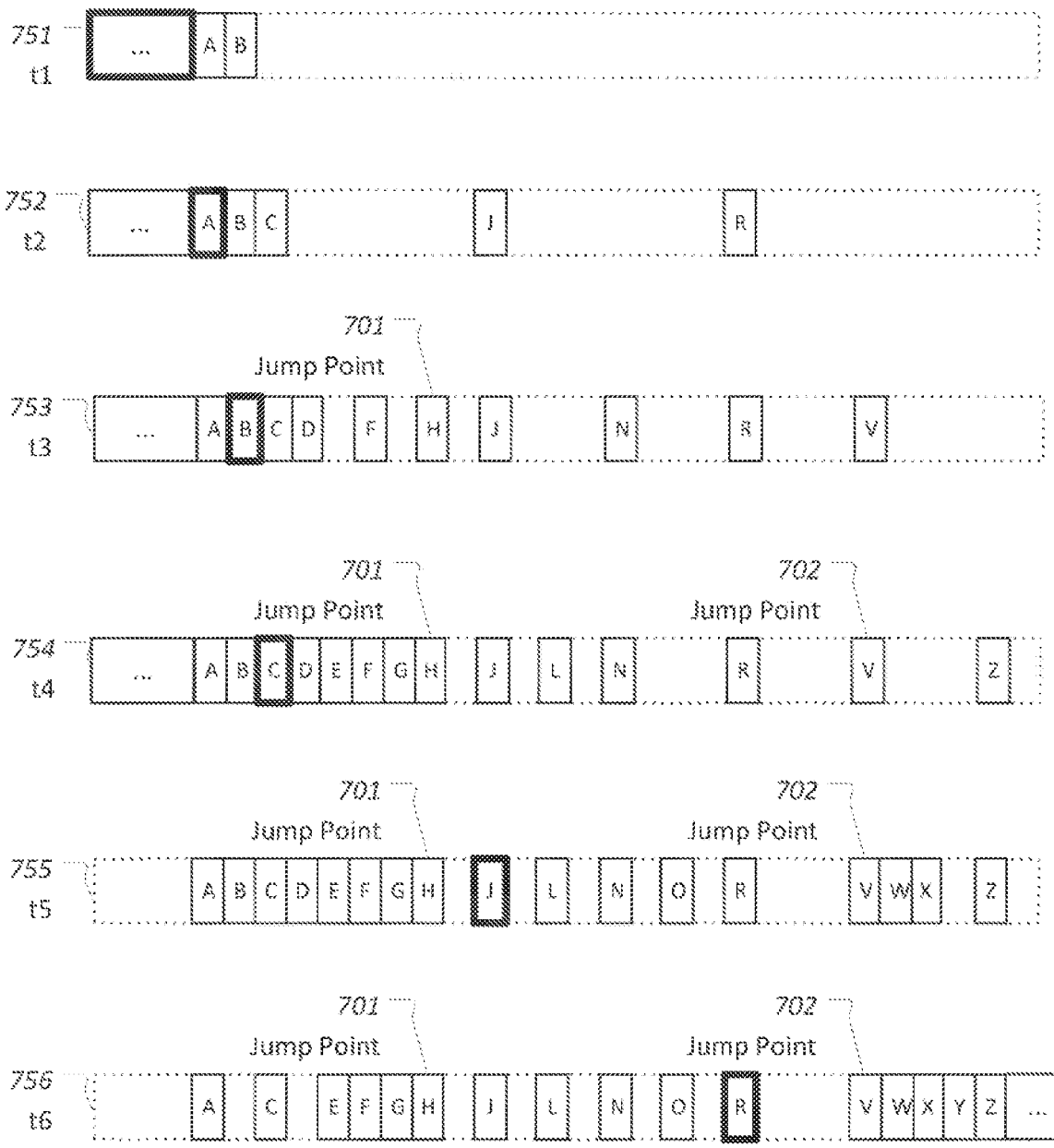
FIG. 7 illustrates example configurations of a streaming client buffer over time, during operation of a streaming client on a video content item having jump points.

Operation of various techniques described above is now illustrated with respect to the example buffer configurations depicted in FIGS. 5-7.

FIG. 5 illustrates an example configuration of a streaming client buffer 550 during operation of a streaming client, in accordance with a described embodiment. In particular, the configuration of buffer 550 is illustrated at a specific moment in time during the streaming of a video content item from a server. The video content item has three different streams 510, 520, and 530, each having different properties and bitrates. Stream 510 is divided into segments 511-515, stream 520 is divided into segments 521-525, and stream 530 is divided into segments 531-535. Segments 511, 521, and 531 comprise frames representing the same content but with different resolutions and/or bitrates. Likewise, segments 512, 522, and 532 represent the same content, segments 513, 523, and 533 represent the same content, and so forth. For illustrative purposes, certain frames of segments 533 and 524 are shown, including frames 533A, 533B, 533E, 524A, and 524E.

A streaming client may send various requests at various times for different portions of content from the video content item. The portions may be requested from different streams, based on current streaming performance and playback conditions. The streaming client stitches the received portions together in a buffer 550 representing the video content item. For example, buffer 550's representation of the video content item begins with segment 511 from stream 510, and then continues with segment 522 from stream 520. Segments 511 and 522 collectively form a normal buffer window 551 from which the client may provide playback of the video content item in a normal mode.

Buffer 550's representation does not include entire whole segments after segment 522, as indicated by missing frames 559. However, in accordance with trick-play optimization techniques described herein, the streaming client has selected a number of individual frames from streams 530 and 520, requested those frames from the server, and added those frames into buffer 550 after segment 522. For example, frames 533A-E have been added to buffer 550, as well as frames 524A-E. These frames have been selected in a manner such as to leave gaps of missing frames in the buffer 550, such as gaps 559A-I. For instance, frames 533A-E and frame 524A-E may be key frames from their respective segments, while gaps 559A-I may include any number of delta frames (and potentially non-selected key frames). The content within buffer 550 from segment 511 up until frame 524E effectively forms a trick-play window 552 of time from which the client may provide playback of the video content item in a trick-play mode, even though gaps 559A-5591 exist.

Finally, the representation of the video content item in buffer 550 includes an unbuffered portion 553, which may eventually be requested and stored in the buffer 550 as operation of the streaming client continues.

FIG. 6 illustrates another example configuration of a streaming client buffer 650 during operation of streaming client, with example playback sequences 660-690 for example playback modes, in accordance with a described embodiment. Buffer 650 comprises a number of frames, labeled A through Z. Buffer 650 includes a set of continuous frames, including frames AF, which may be utilized as a normal buffer window for a normal playback mode. Buffer 650 further comprises a number of individual frames separated by intervals, including frames H, J, L, N, R, V, and Z.

These frames form two different trick-play windows of differing lengths and sample frequency. For example, a shorter trick-play window 652 is formed of frames separated by smaller intervals (e.g. by a single frame), ending with frame N, while a longer trick-play window 653 is formed of frames separated by larger intervals (e.g. by multiple frames), ending with frame Z.

Sequences 660-690 illustrate how buffer 650 may be utilized to provide trick-play playback modes of varying playback rates. Each sequence assumes that a normal playback mode 601 is used up until frame C, and that a fast-forward playback mode 602 is then requested.

Sequence 660 is a sequence of frames that may be displayed by a client if a 2× fast-forward mode is requested. Ideally, every other buffered frame of the video content item would be displayed in this mode. However, since the frequency of frames within the second trick-play window is larger, sequence 660 involves displaying fames R, V, and Z for longer durations (i.e. decreasing the number of frames displayed per second) to make up for the lack of frames.

Sequence 670 is a sequence of frames that may be displayed if a 4× fast-forward mode is requested. Note that fewer frames are played on account of the faster playback rate of the fast-forward operation 602, and that there is no longer a need to increase the playing duration of frames R, V, and Z. Sequence 680 is a sequence of frames that may be displayed if an 8× fast-forward mode is requested, and sequence 690 is a sequence of frames that may be displayed if a 16× fast-forward mode is requested. Each sequence 660-690 is displayed for a progressively shorter overall time and includes progressively fewer frames.

Of course, the exact sequence used may vary depending on the embodiment. For example, the first frame selected for the trick-play mode may be different depending on the embodiment, and consequently impact the rest of the sequence. Likewise, the selection of which frame to show when the buffer does not include the next calculated frame may vary depending on the implementation. For instance, among the many alternative sequences for sequence 670 that could be valid, depending on which frames are of which type, are ABCDHLNRVZ and ABCEHLRVZ. Moreover, instead of always playing frames for the same duration in both the normal playback mode and the fast forward mode, frames may be played for longer durations, in similar manner to frames R, V, and Z. For instance, if frames H and L are lower quality frames relative to frames J and N, the client may choose to skip those frames and play frames J and N for longer durations. Frames may also or instead be played for shorter durations, meaning that, for example, sequences 670, 680, and/or 690 could involve playing all of the frames in the buffer 650, just more quickly.

FIG. 7 illustrates example configurations of a streaming client buffer 750 over time, during operation of a streaming client on a video content item having jump points 701 and 702, in accordance with a described embodiment. Note that many of the features described with respect to FIG. 7 are not unique to embodiments with jump points, except for those features that actually involve the jump points.

The state of buffer 750 is illustrated at five different instances 751-756 corresponding to times t1-t6. The exact interval of time between each of t1-t6 may vary depending on circumstances. The currently playing frame in each instance 751-756 is highlighted in bold.

At t1, buffer 750 comprises a continuous set of frames up until frame B, on account of normal operation of the streaming client in building a normal buffer window of a certain length. No additional frames have been downloaded for a trick-play window.

At t2, normal playback of the video content has reached frame A. A frame C has been added to the normal buffer window, so as to keep the normal buffer window at least a certain distance in front of the current playing position. Additionally, the streaming client has begun to download a certain number of frames ahead of the normal buffer window to support a trick-play operation, should one be requested. These frames include frames J and R. These frames will enable at least some frames to be displayed if the user fast-forwards past frame C before further content can be downloaded, though the number of frames may not yet be ideal for trick-play operations of slower playback rates in certain embodiments.

At t3, normal playback of the video content has reached frame B. A frame D has been added to the normal buffer window, so as to keep the normal buffer window at least a certain distance in front of the current playing position. Additionally, the streaming client has downloaded additional frames ahead of the normal buffer window to better support trick-play operations, should one be requested. These frames include frames F, H, N, and V. Note that the client has filled in some of the previously empty intervals between frames C, J, and R, so as to enable a greater number of frames to be displayed if the user fast-forwards past frame D before further content can be downloaded, thus improving the client's ability to provide trick-play playback over these intervals at slower playback rates. The client's decisions of which frames to download at this point may or may not have been impacted by identifying that frame H is a potential jump point 701, depending on the embodiment.

At t4, normal playback of the video content has reached frame C. Frames E-H have been added to the normal buffer window. In an embodiment, rather than re-downloading Frames F and H, if frames F and H were from an acceptable stream, the client may simply have re-used the existing data stored within the buffer 750, and thus only downloaded frames E and G.

Additionally, the streaming client has downloaded an additional frame L ahead of the normal buffer window to better support trick-play operations of lower playback rates, and an additional frame Z to better support trick-play operations of longer duration, should such operations be requested. In an embodiment, the client may have observed that frame H is a predicted jump point 701, and therefore deliberately decided not to expand the normal buffer window beyond H (e.g. by downloading frame I), but rather to increase the number of frames available for a trick-play operation past frame H, should one be requested.

At t5, a trick-play operation has in fact been requested. The client is fast-forwarding through the buffer 750 by skipping display of certain frames. Playback has reached frame J. Additional frame 0 has been downloaded ahead of the playback position to sustain the quality of the trick-play playback mode. Additionally, in anticipation of trick-play playback potentially ending at another jump point 702 at frame V, the client has begun building a new normal buffer window at frame V by downloading frames W and X.

At t6, the trick-play operation has reached frame R, which depending on the playback mode, if an intervening frame T cannot be downloaded before the next frame needs to be displayed, may be displayed for a longer duration to make up for the lack of any frames between frame R and V. Meanwhile, the new normal buffer window now includes frames Y and Z. Should the client be requested to return to normal playback mode once frame V is reached, the client may resume normal playback with frames V-Z. Further note that, to reduce the size of buffer 750, the client has begun to delete stale frames. Rather than delete the earliest stale frame, however, the client has deleted frames B and D, thus leaving frames A and C available for trick-play playback during a rewind operation, should one be requested. Frames A and C may be deleted at a later time.

Each of the illustrative examples is illustrated with respect to only a limited number of frames to simplify explanation of the described techniques. However, it will be appreciated that typical embodiments will include normal buffer windows and trick-play windows having many more frames. Segments within a trick-play window may include many more frames than illustrated. Intervals between frames outside of the normal buffer window may be significantly greater, while each request for frames within the normal buffer window may add significantly larger ranges of frames to buffers 550/650/750. Moreover, the intervals need not be evenly spaced, or even approximately evenly spaced. Furthermore, the distance between jump points 701 and 702 will typically be much greater. Also, in embodiments, the choice of frame(s) may be constrained due to a requirement of being able to decode the frame(s) in isolation.

To simplify illustration of the described techniques, the examples have been given with distinction between key frames and delta frames. However, as stated in other sections, in many embodiments the only frames that are downloaded within a trick-play window are key frames. Hence, to extend the illustrated examples to such embodiments, it may be assumed that every second frame within FIGS. 6 and 7 are delta frames, and every other frame is a key frame. Of course, in most such embodiments, there will be many more than a single delta frame between each key frame, and the illustrated techniques would modified accordingly.

Moreover, the exact order in which frames are downloaded may vary depending on streaming performance metrics and implementation details. The sizes of the normal buffer window and trick-play buffer window(s) likewise may vary significantly. Moreover, the end of the normal buffer window and the trick-play buffer window will typically be a significantly larger number of frames ahead of the current playback position.

In each of the illustrative examples, only a single buffer 550/650/750 is illustrated. However, it will be understood that there may in fact be any number of buffer spaces. A streaming client may be configured to assemble video content within these buffer spaces in such a manner that, through various links, pointer, memory maps, and/or other memory management constructs, the client is able to utilize these buffer spaces, from a logical perspective, as a single buffer. Hence, only a single buffer is illustrated. Moreover, in an embodiment, there may be different buffer spaces for different streams. Due to the operating of the streaming client, the streaming client may have buffered at least some of the same segments, frames, or other portions of the video content item from multiple streams. For purposes of playback, the client may be configured to always play the highest quality useful version of the portion that it finds in the buffer, and thus, from a logical perspective, ignore the existence of redundant portions of video content from lower-quality streams.

4.2. Example Index

According to an embodiment, an example format for an index of keyframes, such as an index 116, may be an .m3u playlist-based format, such as the .m3u8 format used for HLS. An example excerpt of an index stored in this format is as follows:

```
# EXTM3U
# EXT-X-TARGETDURATION:10
# EXT-X-VERSION:4
# EXT-X-MEDIA-SEQUENCE:0
# EXT-X-PLAYLIST-TYPE: VOD
# EXT-X-I-FRAMES-ONLY
# EXTINF:5.005,
# EXT-X-BYTERANGE:13160@564
main.ts
# EXTINF:5.005,
# EXT-X-BYTERANGE:10716@164312
main.ts
# EXTINF:5.005,
# EXT-X-BYTERANGE:13160@327872
main.ts
```

The index is for a stream stored in a file named main.ts. The EXT-X-I-FRAMES-ONLY tag signifies that the segments identified in the playlist are single I-frames.

The foregoing is merely an example data structure for storing an index. Other data structures may be differently formatted and/or include different elements.

4.3. Quick-Play

According to an embodiment, a system comprising a streaming client and a streaming server or proxy server, such as system 100 or other systems, may be configured to support quick-play playback modes for streaming video. Generally, a quick-play mode involves playing video content at a faster-than-real-time (i.e. faster than intended playback framerate) while simultaneously playing the accompanying audio for the video content, synchronized to the faster-than-real-time playback. A quick-play mode is typically somewhere between a 1× normal playback mode and a 2× fast-forward mode (e.g. 1.3× playback), though the quick-play techniques described herein may also be utilized with other playback speeds.

However, because playback of audio content at a faster-than-real-time rate tends to decrease the comprehensibility of the audio content, in certain modes, the audio content may be processed using various techniques to improve the comprehensibility of the audio content. For example, the audio content may be processed with one or more pitch-correction algorithms to correct the pitches and/or slow-down specific signals within the audio content that correspond to human voices. As another example, low priority content (e.g. periods of silence, imperceptible audio signals, background audio signals without human voices, etc.) may be cut from the audio content that is played during the quick-play mode. Moreover, the rate of playback of the video content may be decreased slightly during periods in which there is human dialog and increased during other periods. These and other techniques allow a viewer to consume a video content item, such as a sports broadcast or a long series of television episodes, at a quicker speed than would normally be possible, without missing dialog or important commentary.

Although the techniques described thus far clearly permit playback of streaming video content at a fast-than-real-time playback rate, a number of complications may arise with respect to providing quick-play modes using those same techniques. For example, in certain embodiments, the audio is interwoven within the same stream as the video content. In such embodiments, the selective downloading of individual frames by the client means that the audio content is not downloaded in advance. Moreover, since the audio content is interwoven with the video content in unpredictable fashion within the stream, to download the audio content would require downloading the whole stream, which the client may be unable to do quickly enough to feed the quick-play playback rate.

In an embodiment, therefore, the video server and/or a proxy server may be configured to provide the streaming client with direct access to the audio content within a stream. A server (whether it be the streaming server or the proxy server) may do so in a variety of manners. For example, the server may generate an audio index, such as an index 116, that can be downloaded by the streaming client. The streaming client may download the audio content separately form the video content using ranged requests. Or, the server may extract the audio content from one of the streams of the video content item, and store the extracted audio content as a separately downloadable stream that is identified within the manifest for the video content item. As yet another example, a proxy server may provide the audio content as a proxy stream, which the client can request using conventional linear streaming techniques, while the proxy server translates the requests into byte-range requests to a streaming server for the original audio content stored within the original stream.

In some embodiments, the streaming client processes and corrects the audio content itself. In other embodiments, the server (i.e. proxy server or streaming server) processes the audio content instead of the streaming client, either in advance of the audio content being requested, in which case a quick-play audio stream may be stored by the server, or by transcoding the audio content on the fly. If needed, such audio content may be accompanied by synchronization metadata indicating which timestamps and/or frame identifiers should be played at which times relative to the processed audio. During quick-play playback, the client downloads the processed audio instead of the original audio content, and synchronizes the quick-play playback of the video content with the processed audio.

In an embodiment, the video content may be streamed and played using any of the same "best-effort" strategies as used for the above-described trick-play modes. For example, the quick-play playback may utilize only key frames or other strategically-selected frames, in the absence of time to download other frames. The client may utilize a key frame index, or a specially created quick-play frame index, to identify such frames. The client may prolong the duration of time for which certain frames are displayed in absence of intervening frames between those frames which have already downloaded. The client may switch between different streams based on performance metrics and the playback rate. The client may prepare for a quick-play mode using jump points. These and/or any other techniques described herein may enable a client streaming a video content item over a slower network to provide a quick play mode of similar quality to that which could be achieved if the entire stream were available locally.

4.4. Skip Mode

In an embodiment, a video player such as video player 142 may further support other trick-play modes known as skip modes. Skip modes may include forward skip modes and backwards (replay) skip modes. Skip modes may further include variants such as a thirty-second skip, a sixty-second skip, a two-minute skip, a skip to a certain timecode (e.g. skipping to markers corresponding to ten minute intervals, chapter markers, commercial markers, etc.), and/or skip modes corresponding to any other durations. Skip modes jump to a new playback position and resume playing the video content item in a normal playback mode from that position without requiring further command input.

In an embodiment, during some or all skip modes, a number of frames may nonetheless be displayed. That is, there may be a certain delay between the receipt of the input commanding the skip mode and the resumption of normal playback from the new playback position. This delay may be fixed (e.g. 1 second), a function of the amount of time being skipped, a function of the amount of time needed to sufficiently buffer content at the new playback position, or a function of other conditions. During this period of time, frames from between the last playback position and the new playback position may be displayed. The number of frames and the frequency with which they are selected may be based on, for example, the amount of delay and a defined skip mode framerate. For instance, if the delay is one second, and a framerate of 15 frames per second is used, then 15 frames may be selected and displayed in rapid succession.

In an embodiment, the video player may therefore treat the skip playback mode as a variant of the fast-forward playback mode where the fast-forward speed is a function of the amount of time skipped and the number of frames to be displayed while skipping, and where the fast-forward playback is to be automatically terminated upon reaching a specified frame.

4.5. Proxy Client

According to an embodiment, a streaming video system, such as system 100, may further include a proxy client deployed between a streaming client and a streaming server or proxy server. The proxy client enables certain techniques described herein to be practiced with respect to devices having streaming clients that are not configured to provide the enhanced trick-play and/or quick-play functionality described herein. Such a proxy client may reside, for example, on a home
router, a cable modem, a set-top box such as a digital video recorder, a network appliance, or any other device on the same local area network.

The proxy client comprises its own streaming client, trick-play optimizer, buffer, and video player, similar to those described with respect to client 140. However, instead of playing a video content item to a display device, the video player of the proxy client streams the video content item over the local area network to one or more destination streaming video players. A destination streaming video player may send input requesting trick-play operations to the proxy client, which then performs the requested trick-play operation with respect to its own buffer, and streams the trick-play playback back to the destination streaming video player.

The destination video player may request the video content item directly from the proxy client, or the proxy client may be configured to intercept requests to certain streaming servers and/or proxy servers, depending on the embodiment.

5.0. Implementation Mechanism—Hardware Overview

According to one embodiment, the techniques described herein are implemented by one or more special-purpose computing devices. The special-purpose computing devices may be desktop computer systems, portable computer systems, handheld devices, smartphones, media devices, gaming consoles, networking devices, or any other device that incorporates hard-wired and/or program logic to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques.

Figure 8:
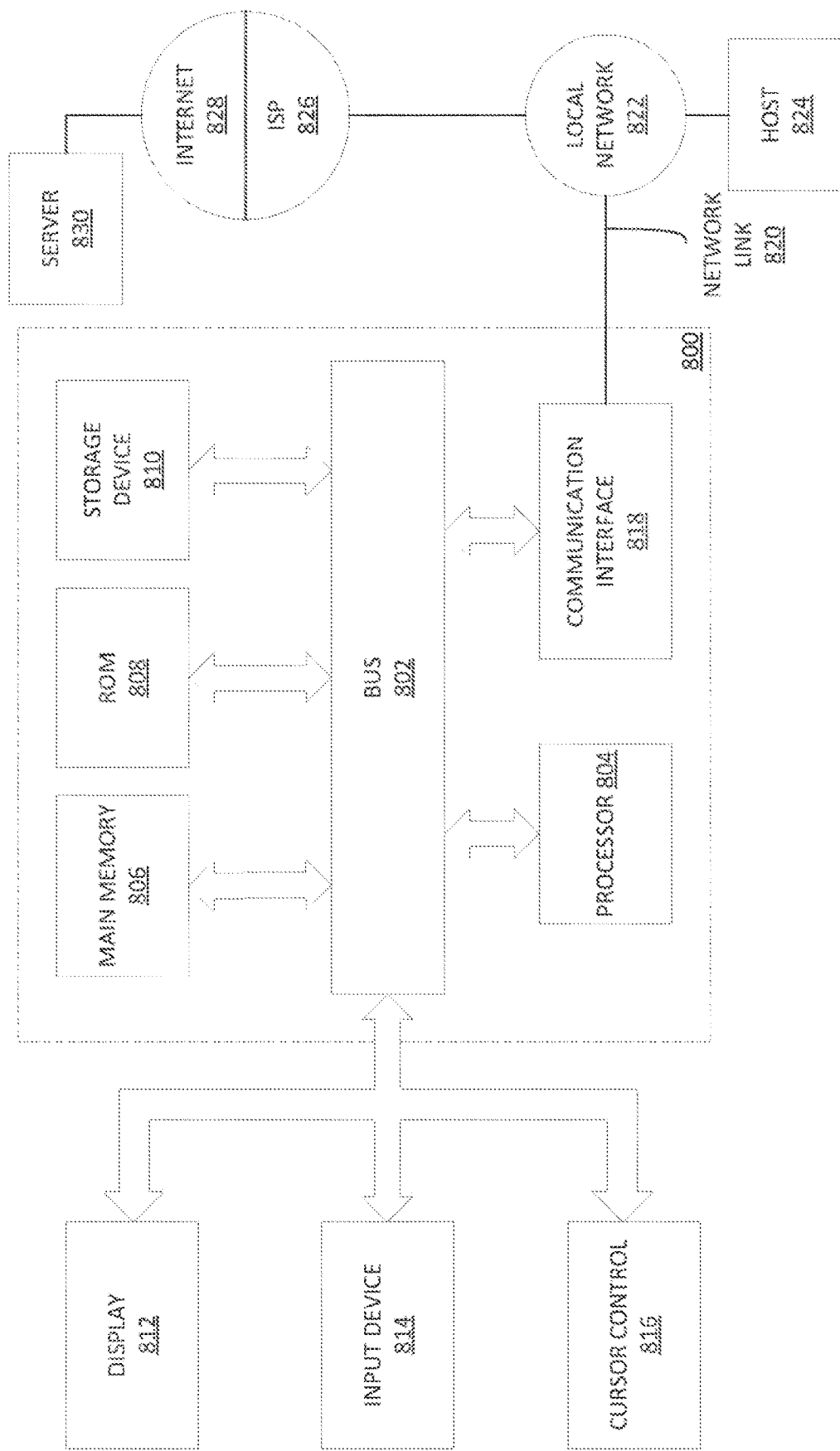
FIG. 8 is block diagram of a computer system upon which embodiments of the inventive subject matter may be implemented.

FIG. 8 is a block diagram that illustrates a computer system 800 utilized in implementing the above-described techniques, according to an embodiment. Computer system 800 may be, for example, a desktop computing device, laptop computing device, tablet, smartphone, server appliance, computing mainframe, multimedia device, handheld device, networking apparatus, or any other suitable device.

Computer system 800 includes one or more busses 802 or other communication mechanism for communicating information, and one or more hardware processors 804 coupled with busses 802 for processing information. Hardware processors 804 may be, for example, a general purpose microprocessor. Busses 802 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 800 also includes a main memory 806, such as a random access memory (RAM) or other dynamic or volatile storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes one or more read only memories (ROM) 808 or other static storage devices coupled to bus 802 for storing static information and instructions for processor 804. One or more storage devices 810, such as a solid-state drive (SSD), magnetic disk, optical disk, or other suitable non-volatile storage device, is provided and coupled to bus 802 for storing information and instructions.

Computer system 800 may be coupled via bus 802 to one or more displays 812 for presenting information to a computer user. For instance, computer system 800 may be connected via an High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 812 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 812.

In an embodiment, output to display 1112 may be accelerated by one or more graphics processing unit (GPUs) in computer system 1100. A GPU may be, for example, a highly
parallelized, multi-core floating point processing unit highly optimized to perform computing operations related to the display of graphics data, 3D data, and/or multimedia. In addition to computing image and/or video data directly for output to display 1112, a GPU may also be used to render imagery or other video data off-screen, and read that data back into a program for off-screen image processing with very high performance. Various other computing tasks may be off-loaded from the processor 1104 to the GPU.

One or more input devices 814 are coupled to bus 802 for communicating information and command selections to processor 804. One example of an input device 814 is a keyboard, including alphanumeric and other keys. Another type of user input device 814 is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane. Yet other examples of suitable input devices 814 include a touch-screen panel affixed to a display 812, cameras, microphones, accelerometers, motion detectors, and/or other sensors. In an embodiment, a network-based input device 814 may be utilized. In such an embodiment, user input and/or other information or commands may be relayed via routers and/or switches on a Local Area Network (LAN) or other suitable shared network, or via a peer-to-peer network, from the input device 814 to a network link 820 on the computer system 800.

A computer system 800 may implement techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and use a modem to send the instructions over a network, such as a cable network or cellular network, as modulated signals. A modem local to computer system 800 can receive the data on the network and demodulate the signal to decode the transmitted instructions. Appropriate circuitry can then place the data on bus 802. Bus 802 carries the data to main memory 806, from which processor 804 retrieves and executes the instructions. The instructions received by main memory 806 may optionally be stored on storage device 810 either before or after execution by processor 804.

A computer system 800 may also include, in an embodiment, one or more communication interfaces 818 coupled to bus 802. A communication interface 818 provides a data communication coupling, typically two-way, to a network link 820 that is connected to a local network 822. For example, a communication interface 818 may be an integrated services digital network (ISDN) card, cable modem, satellite modem, or a modem to provide a data communication connection to a corresponding type of telephone line. As another example, the one or more communication interfaces 818 may include a local area network (LAN) card to provide a data communication connection to a compatible LAN. As yet another example, the one or more communication interfaces 818 may include a wireless network interface controller, such as a 802.11-based controller, Bluetooth controller, Long Term Evolution (LTE) modem, and/or other types of wireless interfaces. In any such implementation, communication interface 818 sends and receives electrical, electromagnetic, or optical signals that carry digital data streams representing various types of information.

Network link 820 typically provides data communication through one or more networks to other data devices. For example, network link 820 may provide a connection through local network 822 to a host computer 824 or to data equipment operated by a Service Provider 826. Service Provider 826, which may for example be an Internet Service Provider (ISP), in turn provides data communication services through a wide area network, such as the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

In an embodiment, computer system 800 can send messages and receive data, including program code and/or other types of instructions, through the network(s), network link 820, and communication interface 818. In the Internet example, a server 830 might transmit a requested code for an application program through Internet 828, ISP 826, local network 822 and communication interface 818. The received code may be executed by processor 804 as it is received, and/or stored in storage device 810, or other non-volatile storage for later execution. As another example, information received via a network link 820 may be interpreted and/or processed by a software component of the computer system 800, such as a web browser, application, or server, which in turn issues instructions based thereon to a processor 804, possibly via an operating system and/or other intermediate layers of software components.

In an embodiment, some or all of the systems described herein may be or comprise server computer systems, including one or more computer systems 800 that collectively implement various components of the system as a set of server-side processes. The server computer systems may include web server, application server, database server, and/or other conventional server components that certain above-described components utilize to provide the described functionality. The server computer systems may receive network-based communications comprising input data from any of a variety of sources, including without limitation user-operated client computing
devices such as desktop computers, tablets, or smartphones, remote sensing devices, and/or other server computer systems.

In an embodiment, certain server components may be implemented in full or in part using "cloud"-based components that are coupled to the systems by one or more networks, such as the Internet. The cloud-based components may expose interfaces by which they provide processing, storage, software, and/or other resources to other components of the systems. In an embodiment, the cloud-based components may be implemented by third-party entities, on behalf of another entity for whom the components are deployed. In other embodiments, however, the described systems may be implemented entirely by computer systems owned and operated by a single entity.

In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

6.0. Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being communicatively coupled to various other components by arrows. These arrows illustrate only certain examples of information flows between the components. Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the foregoing specification, embodiments of the inventive subject matter have been described with reference to numerous specific details that may vary from implementation to
implementation. Thus, the sole and exclusive indicator of what is the inventive subject matter, and is intended by the applicants to be the inventive subject matter, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for performing enhanced trick-play functions, the method comprising:
   receiving metadata describing at least one stream of a video content item, the metadata including frame address information specifying locations of specific video frames within the stream and a jump point indicating a likely location at which a trick-play may be activated;
   based on streaming video content from at least the one stream, maintaining, within a buffer, a normal buffer window of continuous video content for the video content item;
   playing the video content item in a normal playback mode using the normal buffer window, a boundary of the continuous video content maintained ahead of a moving playback position while in the normal playback mode;
   based at least on the frame address information, creating a trick-play window that extends the boundary of the buffer window to incorporate the trick-play window, wherein the trick-play window is created in response to determining that the jump point indicated by the metadata is within a threshold temporal distance from the moving playback position;
   selecting a subset of video frames for buffering in the trick-play window within the buffer, for a portion of the video content item outside of the normal buffer window based on performance metrics indicative of streaming performance of the video content item; and
   during a trick-play operation, while the moving playback position is moving through the portion outside of the normal buffer window, playing the video content item in a trick-play playback mode using video frames only from the selected subset.

2. The method of claim 1, further comprising:
   assembling the buffer for the video content item by repeatedly identifying ranges of video data in the stream to request and adding those ranges to the buffer;
   wherein maintaining the normal buffer window comprises, during the assembling, iteratively identifying a next range of video data for the video content item that is not stored in the buffer and requesting the next range from the stream; and
   wherein maintaining the trick-play window comprises, during the assembling, iteratively identifying, in a sequence of video frames to be played during the trick-play playback mode, a next video frame that is not stored in the buffer, and requesting the next video frame from the stream.

3. The method of claim 1, wherein the selected video frames are individual frames spaced at approximately equal time intervals relative to the video content item.

4. The method of claim 1, wherein the trick-play window buffers the selected video frames without buffering ranges of the available video frames that are in intervals between the selected video frames.

5. The method of claim 1, wherein the selected video frames are key frames whose locations are specified by the frame address information.

6. The method of claim 1, further comprising:
monitoring streaming performance metrics;
wherein the metadata describes a plurality of streams of the video content item, each stream having a different bitrate; and
determining from which stream, of the plurality of streams, to request particular frames of the selected frames in the trick-play window based at least on the performance metrics.

7. The method of claim 1, wherein the frame address information also specifies locations of specific video frames in one or more additional streams, wherein the selected video frames include video frames extracted from the one or more additional streams.

8. The method of claim 1, further comprising:
monitoring streaming performance metrics; and
determining how many video frames to select for the portion of the trick-play window based at least on the performance metrics.

9. The method of claim 1, further comprising:
monitoring streaming performance metrics; and
determining an approximate time interval, relative to timestamps of the available video frames, between each video frame to select for the portion of the trick-play window based at least on the performance metrics; and
selecting which video frames from the portion to buffer based on the approximate time interval.

10. The method of claim 1, further comprising selecting which video frames from the portion to buffer based on a playback rate of the trick-play operation or on an anticipated playback rate of the trick-play operation.

11. A method for performing enhanced trick-play functions, the method comprising:
receiving metadata associated with a continuous sequence of video frames forming a video content item, wherein the metadata includes a jump point indicating a likely location at which a trick-play may be activated;
playing each video frame in a first continuous portion of the sequence, in the order of the sequence, from a buffer in which the first continuous portion is stored;
receiving input requesting a trick-play operation; and
selecting a subset of video frames based on performance metrics indicative of streaming performance of a video content item and the jump point associated with the continuous sequence of video frames;
performing the trick-play operation over at least a second continuous portion of the sequence by playing only the subset of video frames of the second continuous portion, without playing ranges of frames interspersed between each video frame in the subset of video frames, the subset of video frames found in the buffer, the ranges of video frames missing in the buffer, wherein the trick-play operation extends a boundary of the buffer to incorporate the trick-play and is performed in response to determining that the jump point indicated by the metadata is within a threshold temporal distance from a moving playback position.

12. The method of claim 11, wherein each frame of the selected subset of frames is separated by at least one of the missing ranges within the sequence.

13. The method of claim 11, wherein an equal or approximately equal interval of frames separates each frame of the selected subset of frames within the sequence.

14. The method of claim 11, further comprising filling the buffer by streaming video frames in the continuous sequence from a server over time.

15. The method claim 11, further comprising, responsive to the input, requesting at least particular frames in the selected subset of frames from one or more streams of the video content item on a streaming server, without requesting the missing ranges.

16. A system for performing enhanced trick-play functions, comprising:
a user input interface for receiving requests for trick-play operations;
memory configured to store buffered video content; and
control circuitry configured to:
receive metadata describing at least one stream of a video content item, the metadata including frame address information specifying locations of specific video frames within the stream and a jump point indicating a likely location at which a trick-play may be activated;
based on streaming video content from at least the one stream, maintain, within a buffer in the memory, a normal buffer window of continuous video content for the video content item;
play the video content item in a normal playback mode using the normal buffer window, a boundary of the continuous video content maintained ahead of a moving playback position while in the normal playback mode;
based at least on the frame address information, creating a trick-play window that extends the boundary of the buffer window to incorporate the trick-play window, wherein the trick-play window is created in response to determining that the jump point indicated by the metadata is within a threshold temporal distance from the moving playback position, select a subset of video frames for buffering in the trick-play window within the buffer, for a portion of the video content item outside of the normal buffer window based on performance metrics indicative of streaming performance of the video content item; and
during a trick-play operation, while the moving playback position is moving through the portion outside of the normal buffer window, play the video content item in a trick-play playback mode using video frames only from the selected subset.

17. The system of 16, further comprising:
assemble the buffer for the video content item by repeatedly identifying ranges of video data in the stream to request and adding those ranges to the buffer;
wherein maintain the normal buffer window comprises, during the assembly, iteratively identifying a next range of video data for the video content item that is not stored in the buffer and requesting the next range from the stream; and
wherein maintain the trick-play window comprises, during the assembly, iteratively identifying, in a sequence of video frames to be played during the trick-play playback mode, a next video frame that is not stored in the buffer, and
request the next video frame from the stream.

18. The method of claim 16, further comprising:
monitor the performance metrics; wherein the metadata describes a plurality of streams of the video content item, each stream having a different bitrate; and
determine from which stream, of the plurality of streams, to request particular frames of the selected frames in the trick-play window based at least on the performance metrics.

19. The method of claim 16, wherein the frame address information also specifies locations of specific video frames in one or more additional streams, wherein the selected video frames include video frames extracted from the one or more additional streams.

20. The method of claim 16, further comprising:
monitor the performance metrics; and
determine an approximate time interval, relative to timestamps of the available video frames, between each video frame to select for the portion of the trick-play window based at least on the performance metrics, and select which video frames from the portion to buffer based on the approximate time interval.

21. The method of claim 1, wherein, the jump point is a first jump point and the method further comprising determining a second jump point based on the metadata, wherein the subset of video frames for buffering in the trick-play window is bounded by the second jump point indicated by the metadata; and
re-establishing the normal buffer window at the second jump point, without the normal buffer window including the subset of video frames that were buffered in the trick-play window.

22. The method of claim 1, wherein, the jump point is a location within the content item, identified by a timestamp or a frame identifier, at which a user is likely to request a trick-play mode.

* * * * *